United States Patent
Winkler et al.

(10) Patent No.: US 10,095,994 B2
(45) Date of Patent: Oct. 9, 2018

(54) SERVICE LEVEL AGREEMENT TRANSLATION FOR SERVICE ORIENTED SYSTEMS

(75) Inventors: Ulrich Winkler, Belfast (GB); Wasif Gilani, Newtownabbey (GB)

(73) Assignee: SAP SE, Walldorf (DE)

( * ) Notice: Subject to any disclaimer, the term of this patent is extended or adjusted under 35 U.S.C. 154(b) by 1601 days.

(21) Appl. No.: 13/423,997

(22) Filed: Mar. 19, 2012

(65) Prior Publication Data
US 2013/0246105 A1     Sep. 19, 2013

(51) Int. Cl.
*G06Q 10/00*     (2012.01)
*G06Q 10/06*     (2012.01)

(52) U.S. Cl.
CPC ................. *G06Q 10/067* (2013.01)

(58) Field of Classification Search
CPC ........ G06F 15/173; G06F 12/00; G06F 11/00; G06Q 90/00; G06Q 10/067; G06Q 10/0635
USPC ........................................................ 705/7.11
See application file for complete search history.

(56) References Cited

U.S. PATENT DOCUMENTS

| | | | | |
|---|---|---|---|---|
| 7,437,459 | B2 * | 10/2008 | Chidambaran et al. | 709/226 |
| 8,073,721 | B1 * | 12/2011 | Lewis | 705/7.12 |
| 8,102,782 | B2 * | 1/2012 | Pruthi et al. | 370/252 |
| 2003/0149604 | A1 * | 8/2003 | Casati et al. | 705/7 |
| 2005/0066239 | A1 * | 3/2005 | Keeton et al. | 714/47 |
| 2009/0018813 | A1 * | 1/2009 | Kothari et al. | 703/22 |
| 2009/0254411 | A1 * | 10/2009 | Bhattacharya et al. | 705/10 |
| 2011/0004885 | A1 * | 1/2011 | Kikuchi et al. | 718/104 |
| 2012/0232948 | A1 * | 9/2012 | Wolf | G06Q 10/0635 705/7.28 |

OTHER PUBLICATIONS

Grzech, Adam & Rygielski, Piotr & Swiatek, Pawel. (2010). Translations of Service Level Agreement in Systems Based on Service-Oriented Architectures.. Cybernetics and Systems. 41. 610-627. 10.1080/01969722.2010.520225. (Year: 2010).*

(Continued)

*Primary Examiner* — Peter H Choi
*Assistant Examiner* — Alissa D Karmis
(74) *Attorney, Agent, or Firm* — Brake Hughes Bellermann LLP

(57) ABSTRACT

The embodiments include a data processing apparatus for conducting a business impact analysis for a service oriented architecture (SOA) that includes a plurality of processes and services. The data processing apparatus may include a process table generator configured to generate a first impact table for a first process and a second impact table for a second process, and a service table generator configured to generate a service impact table for a top-level service, a dependency model generator configured to generate a dependency model arranging the plurality of services with dependency links, an analysis model generator configured to generate a BEAM based on the service impact table, the dependency model and a selected service level agreement, a simulator configured to simulate the BEAM over a period of time, and a service level agreement classifier configured to classify the selected service level agreement based on one or more violations.

21 Claims, 13 Drawing Sheets

(56) References Cited

OTHER PUBLICATIONS

"Procedures for performing a failure mode, effect and criticality analysis", Military Standard, MIL-STD-1629A, Nov. 24, 1980, 80 pages.

Brall, "Reliability analysis—A Tool Set for Improving Business Processes", 2010 Proceedings on Annual Reliability and Maintainability Symposium (RAMS), Jan. 25-28, 2010, 5 pages.

Cloth, et al, "Model checking for survivability!", Proceedings of the Second International Conference on the Quantitative Evaluation of Systems (QEST'05), 2005, pp. 145-154.

Cox, "What's wrong with risk matrices?", Risk Analysis: An Official Publication of the Society for Risk Analysis, vol. 28, No. 2, Apr. 2008, pp. 497-512.

Jakoubi, et al, "A Survey of Scientific Approaches Considering the Integration of Security and Risk Aspects into Business Process Management", 2009 20th International Workshop on Database and Expert Systems Application, 2009, pp. 127-132.

"Fault tree analysis (FTA)", Australian Standard, Geneva: International Electrotechnical Commission, AS IEC 61025, Ed 2.0, 2008, 8 pages.

Kotsokalis, et al, "Translation of Service Level Agreements: A Generic Problem Definition", Lecture Notes in Computer Science, 2010, vol. 6275, 2009, 10 pages.

Li, et al, "SLA Translation in Multi-Layered Service Oriented Architectures: Status and Challenges", Technical Report, Karlsruhe Institute of Technology, Apr. 17, 2009, 29 pages.

Li, et al, "Performance model driven QoS guarantees and optimization in clouds", 2009 ICSE Workshop on Software Engineering Challenges of Cloud Computing, May 2009, pp. 15-22.

Theilmann, et al, "Multi-level SLA Management for Service-Oriented Infrastructures", Lecture Notes in Computer Science, 2008, vol. 5377, 2008, 12 pages.

Wijnia, et al, "Assessing business continuity risks in IT", 2007 IEEE International Conference on Systems, Man and Cybernetics, pp. 3547-3553.

Tjoa, et al, "A Formal Approach Enabling Risk-Aware Business Process Modeling and Simulation", IEEE Transactions on Services Computing, vol. 4, No. 2, Apr.-Jun. 2011, pp. 153-166.

Winkler, et al, "Business Continuity Management of Business Driven IT Landscapes", Chapter 17, Handbook of Research on Service-Oriented Systems and Non-Functional Properties: Future Directions, IGI Global, 2012, pp. 381-399.

European Search Report for Application No. 13 000 678.6-1958, dated Apr. 24, 2013, 5 pages.

Office Action for Application No. 13 000 678.6-1958, dated Dec. 2, 2013, 5 pages.

* cited by examiner

| Down Time | Financial | Legal | External | Severity |
|---|---|---|---|---|
| 0h | €0.00 | Low | Low | 2.0 |
| 4h | €1,000.00 | Low | Low | 6.0 |
| 8h | €1,000.00 | Medium | High | 21.0 |
| 4d 0h | €1,000.00 | Mega | Mega | 84.0 |

FIG. 10

SERVICE LEVEL AGREEMENT TRANSLATION FOR SERVICE ORIENTED SYSTEMS

TECHNICAL FIELD

This description relates to a business impact analysis and service level agreements for service oriented systems.

BACKGROUND

Business process disruption can lead to financial and legal losses as well as damage to reputation. Business Continuity Management (BCM) aims (1) to identify critical business processes, systems and services, (2) to identify potential threats to services, systems and critical business processes, and (3) to assess and evaluate potential damages or losses that may be caused by a threat to critical business processes. BCM experts refer to these three activities as a Business Impact Analysis (BIA). One outcome of a BIA is a specific time-frame such as Maximum Tolerable Outage Time (MTO), in which a normal level of services and operations has to be restored such that the organization can continue to deliver products and services.

Using the BIA, a BCM expect may select appropriate service level agreements to restore services in order to avoid MTOs. Generally, service level agreements may refer to service offers by service providers for servicing business services of a company. Each service level agreement may include information such as time constraint information that indicates a period of time when the provider is able to restore a service when the service becomes unavailable (e.g., 0 to 4 hours), as well as cost information indicating the cost of providing such service. In one example, the BCM expert may consider a number of different service level agreements related to the electricity service provided to the company. For instance, one service level agreement may provide that the electricity provider is able to restore electricity within 0 to 4 hours in the event of an electrical outage, and another service level agreement may provide that the electricity provider is able to restore electricity within 4-8 hours in the event of an electrical outage. However, the first service level agreement may have a higher cost than the second service level agreement.

In a Service Oriented Architecture (SOA), services often consume other services and therefore may depend on each other. Typically, the relationship among services may be described using a service dependency graph. In evaluating various service level agreements, the BCM expect may need to translate the MTO objective starting from the top-level services, which are directly consumed by business processes, down to lower-level services in the dependency graph, in order to verify that a particular service level agreement can restore a service according to its time constraint information without causing major disruptions in the business process and avoiding MTO violations. Conventional methods for performing such an analysis rely upon general graphical diagrams and spreadsheets, which are often time consuming and cumbersome.

SUMMARY

The embodiments include a data processing apparatus for conducting a business impact analysis for a service oriented architecture (SOA) that includes a plurality of processes and services. The data processing apparatus may include at least one processor and a non-transitory computer-readable storage medium including instructions executable by the at least one processor. The instructions are configured to implement a process table generator configured to generate a first impact table for a first process and a second impact table for a second process, and a service table generator configured to generate a service impact table for a top-level service based on the first impact table and the second impact table. Each of the first impact table, the second impact table and the service impact table may have at least one time interval and at least one impact category. The instruction are also configured to implement a dependency model generator configured to generate a dependency model arranging the plurality of services with dependency links, where at least one service of the dependency model is annotated with risk information associated with the at least one service. The instructions are configured to implement an analysis model generator configured to receive a selected service level agreement and generate a Behavior Analysis Model (BEAM) based on the service impact table, the dependency model and the selected service level agreement, where the selected service level agreement includes at least time constraint information. The instructions are configured to implement a simulator configured to simulate the BEAM over a period of time including determining one or more violations for the at least one service for the selected service level agreement and a service level agreement classifier configured to classify the selected service level agreement based on the one or more violations.

In one embodiment, each of the first impact table, the second impact table and the service impact table provides a total severity value for each time interval, the total severity value indicates an expected business impact for a respective time interval, and each impact table provides an impact value for each impact category within each time interval.

Also, the process table generator may be configured to generate the first impact table and the second impact table, and the service table generator may be configured to generate the service impact table includes calculating a severity value for each impact value in a respective impact table, and summing the severity values for the at least one impact category within each time interval to generate the total severity value for each time interval.

The process table generator may be configured to generate the first impact table includes generating a third impact table corresponding to a third process, where the third process is dependent upon an output of the first process, the third process is associated with an offset value, and the offset value indicates a period of time that the third process is able to proceed without disruption when the output of the first process is unavailable. Generation of the first impact table may include adjusting one or more time intervals for the third impact table by the offset value, assigning the third impact table having the adjusted time intervals to the first process, and merging the first impact able and the third impact table having the adjusted time intervals to generate the first impact table for the first process.

The service table generator may be configured to generate the service impact table includes assigning the first impact table and the second impact table to the top-level service, and merging the first impact table and the second impact table to generate the service impact table.

In one embodiment, the risk information may include a failure rate and a probability rate that a service provider is able to recover the at least one service. At least one dependency link of the dependency model may be annotated with one of a recovery time and delay impact time. The BEAM may be a petri-Net model and the analysis model generator may be configured to generate the BEAM includes generating a plurality of patterns based on the service impact table, the risk information, the plurality of services, and the time constrain information.

The simulator may be configured to simulate the BEAM includes determining a number of times the top-level service is unavailable over the period of time, determining a number of times the time constraint information is violated for one or more time intervals of the service impact table, and determining a type of violation based on whether the total severity associated with a respective time interval is above a threshold level.

Also, the service level agreement classifier maybe configured to classify the selected service level agreement includes classifying the selected service level agreement based on the number and type of violations.

The embodiments also provide a method for conducting a business impact analysis for a service oriented architecture (SOA) that includes a plurality of processes and services. The method may include generating a first impact table for a first process and a second impact table for a second process, and generating a service impact table for a top-level service based on the first impact table and the second impact table. Each of the first impact table, the second impact table and the service impact table may have at least one time interval and at least one impact category. The method may include generating a dependency model arranging the plurality of services with dependency links, where at least one service of the dependency model is annotated with risk information associated with the at least one service, and receiving a selected service level agreement. The selected service level agreement may include at least time constraint information. The method may include generating a Behavior Analysis Model (BEAM) based on the service impact table, the dependency model, and the selected service level agreement, simulating the BEAM over a period of time including determining one or more violations for the at least one service for the selected service level agreement, and classifying the selected service level agreement based on the one or more violations.

In one embodiment, each of the first impact table, the second impact table and the service impact table provides a total severity value for each time interval, the total severity value may indicate an expected business impact for a respective time interval, and each impact table may provide an impact value for each impact category within each time interval.

Generating the first impact table, the second impact table, and the service impact table may include calculating a severity value for each impact value in a respective impact table, and summing the severity values for the at least one impact category within each time interval to generate the total severity value for each time interval.

Generating the first impact table may include generating a third impact table corresponding to a third process. The third process may be dependent upon an output of the first process, the third process may be associated with an offset value, and the offset value may indicate a period of time that the third process is able to proceed without disruption when the output of the first process is unavailable. The method may also include adjusting one or more time intervals for the third impact table by the offset value, assigning the third impact table having the adjusted time intervals to the first process, and merging the first impact able and the third impact table having the adjusted time intervals to generate the first impact table for the first process.

Generating the service impact table for the top-level service may include assigning the first impact table and the second impact table to the top-level service, and merging the first impact table and the second impact table to generate the service impact table.

Determining one or more violations may include determining a number of times the top-level service is unavailable over the period of time, determining a number of times the time constraint information is violated for one or more time intervals of the service impact table, and determining a type of violation based on whether the total severity associated with a respective time interval is above a threshold level.

Classifying the selected service level agreement may include classifying the selected service level agreement based on the number and type of violations.

The embodiment may provide a non-transitory computer-readable medium storing instructions that when executed cause one or more processors to perform a process. The instructions comprising instructions generate a first impact table for a first process and a second impact table for a second process and generate a service impact table for a top-level service based on the first impact table and the second impact table. Each of the first impact table, the second impact table and the service impact table may have at least one time interval and at least one impact category. The instructions may generate a dependency model arranging the plurality of services with dependency links. At least one service of the dependency model may be annotated with risk information associated with the at least one service. The instructions may receive a selected service level agreement, where the selected service level agreement includes at least time constraint information. The instructions may generate a Behavior Analysis Model (BEAM) based on the service impact table, the dependency model, and the selected service level agreement, simulate the BEAM over a period of time including determining one or more violations for the at least one service for the selected service level agreement, and classify the selected service level agreement based on the one or more violations.

In one embodiment, each of the first impact table, the second impact table and the service impact table provides a total severity value for each time interval, the total severity value may indicate an expected business impact for a respective time interval, and each impact table may provide an impact value for each impact category within each time interval.

The instruction include instructions to calculate a severity value for each impact value in a respective impact table and sum the severity values for the at least one impact category within each time interval to generate the total severity value for each time interval.

The details of one or more implementations are set forth in the accompanying drawings and the description below. Other features will be apparent from the description and drawings, and from the claims.

BRIEF DESCRIPTION OF THE DRAWINGS

FIG. 10 illustrates an example user interface providing a merged impact table for a business process according to an embodiment;

DETAILED DESCRIPTION

Figure 1:
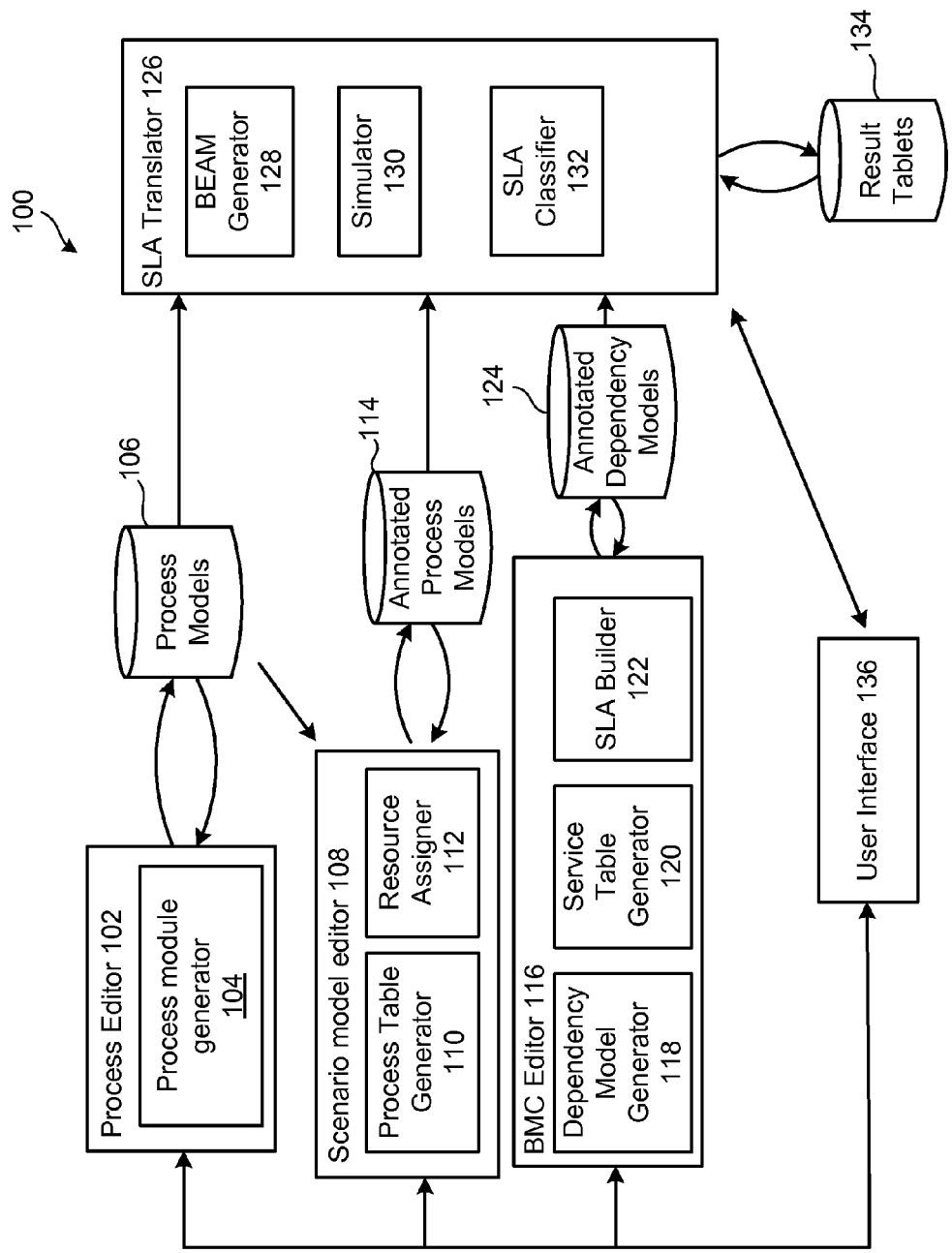
FIG. 1 illustrates a data processing apparatus for conducting a business impact analysis for a service oriented architecture (SOA) having a plurality of processes and services according to an embodiment.

FIG. 1 illustrates a data processing apparatus 100 for conducting a business impact analysis for a service oriented architecture (SOA) having a plurality of processes and services according to an embodiment.

Referring to FIG. 1, the data processing apparatus 100 may include a process editor 102 that models a plurality of business processes, a process model database 106 for storing the business process models, a scenario model editor 108 for annotating the business process models with resources and business impact tables, an annotated process model database 114 for storing the annotated business process models, a Business Continuity Management (BCM) editor 116 that creates dependency models arranging a plurality of services and annotates the dependency model with risk information, service impact tables, recovery times, delay times, and service level agreement (SLA) information, an annotated dependency model database 124 for storing the annotated dependency models, an SLA translator 126 for translating the SLA information into different classifications of SLAs using the annotated dependency models and process models, a result table database 134 for storing the results of the SLA translator 126, and an interactive user interface 136 for communicating with a user, as further explained above. The user may be a business continuity manager (BCM) expert or any other person that wishes to carry out a business impact analysis for an SOA having a plurality of processes and services.

The process editor 102 may include a process model generator 104 for generating process models. Each process model may include one or more business processes. The process editor 102 may be any conventional editor that is capable of modeling business processes. A business process may encompass any type of business process known to one of ordinary skill in the art. For instance, a business process may be a collection of related, structured activities or tasks. The process model generator 104 may receive information via the user interface 136 and generate a process model having a plurality of business processes. An example of a process model is illustrated with respect to FIG. 4, which is further described below. The process editor 102 may store the process models in the process model database 106.

The scenario model editor 108 may include a process table generator 110 and a resource assigner 112. The scenario model editor 108 may be an extension of the process editor 102, which allows the user to annotate the process models stored in the process model database 108. Alternatively, the scenario model editor 108 may be a separate editor for annotating process models. The process table generator 110 may generate an impact table for one or more of the processes in the process model. For example, when conducting a business impact analysis, the user may have to quantify the business impact if a business process is disrupted. The user may have to consider various dimensions, for example, legal consequences, financial impact, or external damages. Although some of these dimensions may be relatively easily quantifiable, some of them can only be expressed in qualitative form. Financial consequences are, for example, a quantifiable dimension. However, legal consequences or the damage to external reputation are not easily expressed as numeric values, and may depend on human judgment. In order to quantify these dimensions, the process table generator 110 may generate an impact table based on information provided from the user via the user interface 136. An example of the impact table for a particular is provided below with reference to the following table.

TABLE 1

Impact Table for Process A

| | Down Time (h) | Financial | Legal | Eternal | Total Severity Value |
|---|---|---|---|---|---|
| 1 | 0-4 | 0.00 | LOW | LOW | 2 |
| 2 | 4-8 | 1000.0 | LOW | LOW | 6 |
| 3 | 8-infinity | 1000.0 | MEDIUM | HIGH | 21 |

Process A may be one process among the plurality of processes in the process model. The impact table includes a set of quantitative or qualitative dimensions and a time dimension. In the example of Table 1, the impact table includes three dimensions: the financial impact (quantitative), legal (qualitative) and external (qualitative) consequences. However, the process table generator 110 may generate the impact table to include any number and type of dimensions. For example, the user may add or remove dimensions via the user interface 136 according to the business requirements.

A column in the business impact table may be referred to as a dimension, and a row may be referred to as a time interval. In the example of Table 1, the first dimension is the time dimension. The subsequent dimensions include impact categories—financial (quantitative), legal (qualitative) and external (qualitative). An entry in the qualitative dimensions may have five different impact values: NONE, LOW, MEDIUM, HIGH or MEGA. An entry in the quantitative dimensions may be the numeric value corresponding to its impact category. For example, with reference to the financial impact category, the impact value includes a currency amount. As such, the impact value may represent an expected business impact for its corresponding time interval. For instance, if process A is interrupted between 4-8 hours, it may cost a company 1,000.00 dollars and suffer LOW legal consequences and LOW external consequences.

Using the scenario model editor 108, a user may change the impact values for the impact categories, as well as delete or add any other type of impact category via the interface 136. Based on the information received from the user, the process table generator 110 may generate an impact table for one or more of the processes from the process model. For example, the process table generator 110 may calculate a severity value for each impact value in the impact table, and then calculate a total severity value for each row or time interval. Then, the process table generator 110 may add the severity values across the impact categories for one time interval to generate the total severity value for a respective time interval. In the example of Table 1, for the time interval of 4-8 hours, the total severity value is 6. The total severity value may indicate an expected business impact for a respective time interval, which is quantified in numerical form. In order to calculate a severity value for each impact value, the process table generator 110 may use mapping information that maps currency amounts to impact values (e.g., NONE, LOW, MEDIUM, HIGH, or MEGA) and then translates the impact values to numerical severity values. For example, the impact value of HIGH may relate to a numerical value of 13. The details of computing the severity values from impact values are further explained below.

In addition, business processes may be dependent upon other business processes. In one example, process B may be dependent upon the output of process A, and process B may function unaffected by the disruption of process A for one hour. The time interval of one hour may be referred to as an offset. According to the embodiments, the process table generator 110 may account for the dependencies among the processes by assigning multiple impact tables to a process, and merging the multiple impact tables to generate a merged impact table. For example, continuing with the above example, the process table generator 110 may assign the impact table of process B with the offset of one hour to process A, which results in process A having two impact tables. Subsequently, the process table generator 110 merges both of these impact tables to create a merged impact table for process A. These features are described later in the disclosure.

Once the impact tables for the processes in the process model are created, the scenario model editor 108 may display the (merged) impact tables via the user interface 136. Using the information from the impact tables, the scenario model editor 108 may define a maximum tolerable outage time (MTO) for each process based on a risk appetite level provided from the user via the user interface 136. Alternatively, the SLA translator 126 may provide a simulation dialog to the user via the user interface 136 for selecting the type of risk appetite level. The MTO for a process represents the maximum amount of time an organization can afford that the process is not executed. Defining the MTO for a process provides the deadline when this process must be executable again after a disruption. The risk appetite may be a numerical value and expresses the risk level an organization or business is willing to accept. For example, the scenario model editor 108 may provide for a selection of the risk appetite via the interface 136. In one embodiment, the selection may include risk levels of HIGH, MEDIUM, and LOW.

The scenario model editor 108 or the SLA translator 126 may receive the selected risk level via the interface 136, and translate the risk level into a severity value. If the user selects a risk appetite level of HIGH, the scenario model editor 108 or the SLA translator 126 translates the HIGH level into a severity value such as 13. For example, the process table generator 110 may have associated a numeric value of 13 to the level of HIGH when generating the impact tables. In this case, the scenario model editor 108 or the SLA translator 126 may translate the risk level of HIGH into the numeric value of 13. Then, the rows of the impact table with a severity value of 13 and greater may be selected. Referring to the example of Table 1, row 3 may be selected. Thereafter, upon selection of the appropriate rows equal to or above the risk appetite level, the scenario model editor 108 or SLA translator 126 may determine the MTO based on the time interval associated with the row having the lowest time interval. Referring to Table 1, since only one row is selected, the MTO may be determined as 8 hours. In another example, if the risk appetite level is associated with a numerical value of 5, the scenario model editor 108 or the SLA translator 126 may select rows 2 and 3 because the time interval associated with these rows is equal to or above the risk appetite value of 5. In this case, the scenario model editor 108 or the SLA translator 126 may determine the MTO as 4 hours.

The resource assignor 112 is configured to assign certain services or resources to each business process of the process model. For example, process A may be "accounts collectable." The accounts collectable process may depend on certain resources such as the number of people in the accounts collectable department and/or a telephone service. According to an embodiment, the user may utilize the user interface 136 and assign certain resources or services to each business process. As such, the resource assignor 112 annotates the process model with this assignment information.

The scenario model editor 108 may store the process models annotated with the impact tables and resource/service assignments in the annotated process model database 114.

The BCM editor 116 may include a dependency model generator 118, a service table generator 120 and an SLA builder 122. The BCM editor may be any type of generic business continuity model editor that is configured to model a service dependency graph. The dependency graph may include an arrangement of a plurality of services having dependency links. The dependency links may indicate the relationship among the plurality of services. An example of the service dependent graph is illustrated with respect to FIG. 13. A service may be any type of business service delivered to one or more business customers. The dependent model generator 118 may receive information from the user via the user interface 136 and create the service dependency model based on the user's commands.

According to the embodiments, the service table generator 120 may generate a service impact table for one or more services including a top-level service. A top-level service is a service that is directly consumed by one or more business processes. In one example, if the top-level service is directly consumed by process A and process B, the service table generator 120 may generate the service impact table based on the impact table for process A and the impact table for process B. As further explained below, the service table generator 120 may assign the impact table for process A and the impact table for process B to the top-level service, and then merge the impact tables to create a merged impact service table for the top-level service. An example of the service impact table is provided below with respect to Table 2.

TABLE 2

Service Impact Table for Top-Level Service

| | Down Time (h) | Financial | Legal | Eternal | Total Severity Value |
|---|---|---|---|---|---|
| 1 | 0-4 | 0.00 | LOW | LOW | 2 |
| 2 | 4-6 | 1000.0 | LOW | LOW | 6 |
| 3 | 6-96 | 1000.0 | MEDIUM | HIGH | 21 |
| 4 | 96-infinity | 1000.0 | MEGA | MEGA | 84 |

Generally, the service table generator 120 may receive the process impact tables related to each top-level service in the service dependency graph, and generate the service impact table for each top-level service based on its relevant process impact tables. The service table generator 120 may perform two steps—assign the relevant process impact tables and merge the assigned process impact tables into a service impact table. As shown above, the service impact table is similar to the process impact tables for the business processes. For example, Table 2 indicates the various impact values for a number of time intervals. In one example, if the top-level service is unavailable for 0-4 hours, it is expect to have a financial impact to 0.00 dollars, a legal impact of LOW and an external impact of LOW. The service table generator 120 generates the severity values in the same manner as described above with reference to the process impact tables. The generation of the service impact tables is further explained below.

Also, similar to the process impact tables, the MTO for one or more services including the top-level service may be determined based on the risk appetite level. For example, the BCM editor 116 or the SLA translator 126 may provide for selection among a plurality of risk appetite levels via the user interface 136. Upon selection of a risk appetite level, the BCM editor 116 or the SLA translator 126 may select the appropriate rows in the service impact table, and determine the MTO as the time interval having the lowest time period for rows having a severity value equal to or above the severity value associated with the risk appetite level.

The SLA builder 122 may receive service level information from the user via the user interface 136 and create a service level agreement table associated with one or more services of the dependency model. The service level agreement table includes a plurality of service level agreements (SLAs). Generally, an SLA may refer to an agreement or offer to provide services, which may include time constraint information and/or cost information. The user may be interested in evaluating the SLAs in order to determine whether one or more of the SLAs are capable of providing sufficient support. For example, the top-level service may be dependent upon a service such as electricity. In this case, the user may want to evaluate certain SLAs associated with the electricity service in order to determine their impact on the dependency model, in particular the top-level service and business processes. In other words, the user may want to determine if one or more SLAs are sufficient for maintaining one or more business processes. An example of an SLA table is provided below with respect to Table 3.

TABLE 3

Service level Agreement Table

| | Provider | Time (min) | Time (max) | Price | Price Incentive | Price per incident |
|---|---|---|---|---|---|---|
| 1 | P1 | 0.0 | 4.0 | 2000.0 | 0.00 | 0.00 |
| 2 | P1 | 4.0 | 6.0 | 1000.0 | 0.00 | 0.00 |
| 3 | P2 | 0.0 | 12.0 | 500.0 | 250.0 | 0.0 |
| 4 | P3 | 12.0 | Infinity | 100.0 | 0.00 | 500.0 |

Table 3 illustrates four different SLAs. The time constraints are provided by the values Time (min) and Time (max). For example, the recovery time constraints may indicate the expected period of time that the service provider (e.g., P1, P2, P3) is able to recover services. Price per year may denote the cost to subscribe to that SLA per year regardless if the service fails or not. Price incentive may be an additional bonus which is paid to the provider if the service does not fail once within that year. Price per incident may be the cost the service user has to pay to the provider if a service needs to be recovered. Penalty costs are the cost the service provider pays the service customer every time a service fails. It is noted that the embodiments encompass any type of attribute related to SLAs, not only the specific attributes provided in Table 3.

The SLA builder 122 may receive this information from the user via the user interface 136 and create the SLA table as shown above. The BMC editor 116 may annotate the dependency model with the service impact tables and the SLA information.

The BCM editor 116 also may annotate the dependency model with risk information. The risk information may include a failure rate and a probability rate that the service provider is able to recover a respective service. For example, the user may enter risk information associated with one or more services via the user interface 136. In one example, the user may enter a list of risks to one or more services of the dependency model and the potential failure rate each risk imposes on a respective service. Further, the user may enter the probability a service provider is able to recover the service in time. With respect to the electricity service, a fuse may blow, which is not a rare event. In this case, it is very likely that the service provider is able to replace the broken fuse within the time constraint. However, if electricity fails due to a heavy flood or an earthquake, which is a rare event, the service provider may not be able to restore electricity within the time constraints. As such, with respect to one or more services in the dependency model, the BCM editor 116 may annotate the dependency graph with the risk information provided from the user via the user interface 136. Further, as indicated above, the services may be dependent upon each other, which are reflected by the dependency links in the dependency model. The BCM editor 116 may annotate one or more dependency links with dependency information such as recovery times and delay impact times. The annotated dependency graphs are stored in the annotated dependency model database 124.

The user may wish to evaluate one or more SLAs with respect to a service in order to determine whether the SLAs are acceptable in order to avoid disruptions to the business processes. Via the user interface 136, the user may select one or more SLAs from the SLA table, as shown in Table 3, in order to further analyze which selected SLAs are capable of providing sufficient recovery support and whether any selected SLAs violate the MTO objective of top-level services or business processes.

The SLA translator 126 includes a Behavior Analysis Model (BEAM) generator 128 that generates a BEAM model based on the service impact tables, the annotated dependency model and the selected SLAs, a simulator 130 that simulates the BEAM over a period of time in order to determine one or more violations for the one or more services associated with the selected SLAs, and an SLA classifier 132 that classifies the SLAs based on the one or more violations.

For example, the BEAM generator 128 translates service impact tables, the annotated dependency model and the selected SLAs into a series of BEAM patterns. In one embodiment, the BEAM model may be a Petri-Net model. Generally, the BEAM generator 128 may use transformation patterns for generating the Petri-Net patterns based on the service impact tables, the annotated dependency model and the selected SLAs. The Petri-Net BEAM is further explained with reference to FIG. 16.

The SLA translator 126 may provide a simulation dialog providing simulation options for selection by the user via the user interface 126. For example, the simulation dialog may provide for selecting a simulation start date and a simulation end date. The user may have the option of selecting any period of time including hours, days, months, and years. Further, the simulation dialog may provide an option for selecting the number of simulation runs, and an option for selecting the risk appetite level.

The simulator 130 may simulate the BEAM over the period of time and according to the number of simulations runs specified in the simulation dialog. During the simulation, the simulator 130 may determine one or more violations for the service(s) relating to the selected SLAs. For example, the simulator 130 may determine a number of times the top-level service is unavailable over the period of time, determine a number of times the time constrain information (e.g., from the SLAs) is violated for each time interval of the service impact table, and determine a type of violation (e.g., major or minor) based on whether the total severity values associated with the time intervals is equal to or above the MTO. In one example, the simulation may be performed 10 times over a 3 year period of time. During this simulation period, the simulator 130 may determine a number of times a service was not restored within the time constraint information provided in the service level agreement table for a respective service provider. Further, the simulator 130 may count the number of times the top-level service was unavailable, and whether the time constrain information was violated for the time intervals identified as above the MTO threshold (e.g., referred to as SLA violation places) for the top-level service. If a violation is determined in the top-level service for a time interval above the MTO threshold, the simulator may determine the violation as a major violation. Other violations may be determined as minor.

Based on the determined one or more violations, the SLA classifier 132 may classify the SLAs. For example, the SLA classifier 132 may classify the SLAs into a number of different categories—e.g., incapable SLAs, capable SLAs, satisfactory SLAs and optimal SLAs.

The SLA classifier 132 may classify an SLA as an incapable SLA if the SLA is not able to recover a service within a given time constraint, and at least one major violation is determined. The SLA classifier 132 may classify an SLA as a capable SLA if the SLA is able to achieve a recovery within the given time constraint and prevents a failure propagation to a top-level service. However, a capable SLA does not necessarily guarantee recovery or failure prevention in all cases, e.g., in some simulation runs the simulator 130 may determine a top-level violation. The SLA classifier 132 may classify an SLA as a satisfactory SLA if the capable SLA has a residual risk equal to or lower than a predefined residual risk threshold. For example, the user may state that a recovery must be successful in 90.0% of all cases, which the residual risk threshold would be set to 10.0%. As such, the SLA classifier 132 may classify an SLA as satisfactory if the simulator 130 determines violations in less than 10% of all simulation runs.

If the SLA classifier 132 classifies more than one SLA as satisfactory for a service, the SLA classifier 132 may rank the satisfactory SLA according to some other criteria such as cost. Therefore, the SLA classifier 132 may list (or select) the satisfactory SLA with the minimum costs.

The SLA translator 126 may store the results of the simulation and the classification in the results table database 134. Further, the SLA translator 126 may display the results on the user interface 136. The user interface 136 may arrange the selected SLAs according to their classification and/or their rank. For example, SLAs classified as capable may be presented before the SLAs classified as incapable, and the optimal SLA may be presented first. Also, the user interface 136 may display the simulation results indicating the number and type of violations. The simulation results are further described with reference to FIG. 17.

Figure 2:
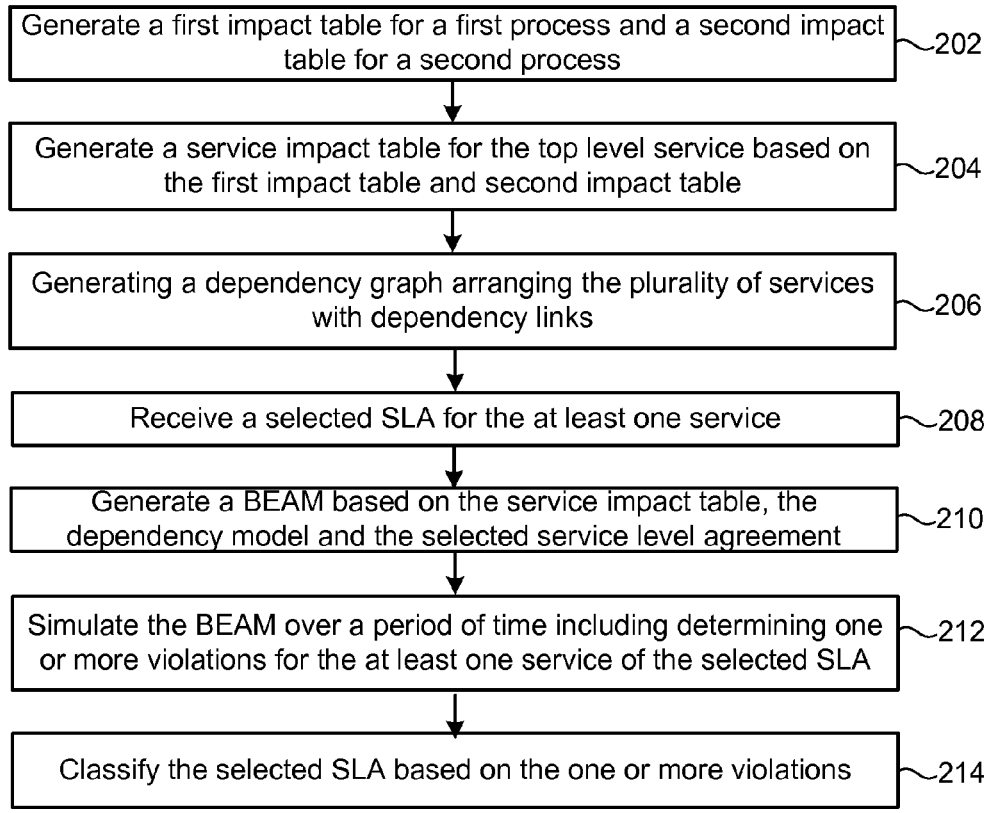
FIG. 2 is a flowchart illustrating example operations of the data processing apparatus of FIG. 1.

FIG. 2 is a flowchart illustrating example operations of the data processing apparatus 100 of FIG. 1. Although FIG. 2 is illustrated as a sequential, ordered listing of operations, it will be appreciated that some or all of the operations may occur in a different order, or in parallel, or iteratively, or may overlap in time.

A first impact table for a first process and a second impact table for a second process may be generated (202). For example, the process table generator 110 may generate the first impact table for the first process and the second impact table for the second process. For instance, the process editor 102 may create a process model having a plurality of processes including the first process and the second process. The scenario model editor 108 may annotate the process model with impact tables. For example, the process table generator 110 may generate the first impact table and the second impact table to include at least one time interval and at least one impact category. The at least one impact category may include the financial impact (quantitative), legal (qualitative) and external (qualitative) consequences. However, the process table generator 110 may generate the first and second impact tables to include any number and type of dimensions. The process table generator 110 may generate the first and second impact tables to be similar to Table 1 above. Also, in one embodiment, the top-level service may be directly consumed by the first and second processes.

A service impact table for the top-level service may be generated based on the first impact table and the second impact table (204). For example, the service table generator 120 may generate the service impact table for the top-level service based on the first impact table and the second impact table. In one embodiment, the service table generator 120 may assign the first impact table for the first process and the second impact table for the second process to the top-level service. Then, the service table generator 120 may merge the first and second impact tables to create a merged impact service table for the top-level service. The service table generator 120 may generate the service impact table to be similar to Table 2 above.

A dependency model arranging the plurality of services with dependency links may be generated (206). For example, the dependency model generator 118 may generate the dependency model having the plurality of services. Further, the plurality of services may be dependent on each other, and thus the dependency model may include one or more dependency links. According to one embodiment, at least one of the dependency links may be annotated with risk information associated with at least one service. The risk information may include a failure rate and a probability rate that the service provider is able to recover a respective service. For example, the user may enter risk information associated with one or more services via the user interface 136. In one example, the user may enter a list of risks to one or more services of the dependency model and the potential failure rate each risk imposes on a respective service. Further, the user may enter the probability a service provider is able to recover the service in time.

A selected SLA may be received (208). For example, the BEAM generator 128 may receive the selected SLA, which has been selected from an SLA table having a plurality of SLAs.

A BEAM may be generated based on the service impact table, the dependency model and the selected service level agreement (210). For example, the BEAM generator 128 may generate the BEAM based on the service impact table, the dependency model and the selected service level agreement. In one embodiment, the BEAM model may be a Petri-Net model. Generally, the BEAM generator 128 may use transformation patterns for generating the Petri-Net patterns based on the service impact tables, the annotated dependency model and the selected SLAs.

The BEAM may be simulated over a period of time including determining one or more violations for the at least one service of the selected SLA (212). For example, the SLA translator 126 may provide a simulation dialog providing simulation options for selection by the user via the user interface 126. The simulation dialog may provide the period of time and the number of simulation runs. Then, the simulator 130 may simulate the BEAM over the period of time and according to the number of simulations runs specified in the simulation dialog. During the simulation, the simulator 130 may determine one or more violations for the service(s) relating to the selected SLAs. For example, the simulator 130 may determine a number of times the top-level service is unavailable over the period of time, determine a number of times the time constrain information (e.g., from the SLAs) is violated for each time interval of the service impact table, and determine a type of violation (e.g., major or minor) based on whether the total severity values associated with the time intervals is equal to or above the MTO.

The selected SLA may be classified based on the one or more violations (214). For example, based on the determined one or more violations, the SLA classifier 132 may classify the SLAs. In one example, the SLA classifier 132 may classify the SLAs into a number of different categories—e.g., incapable SLAs, capable SLAs, satisfactory SLAs and optimal SLAs.

Figure 3:
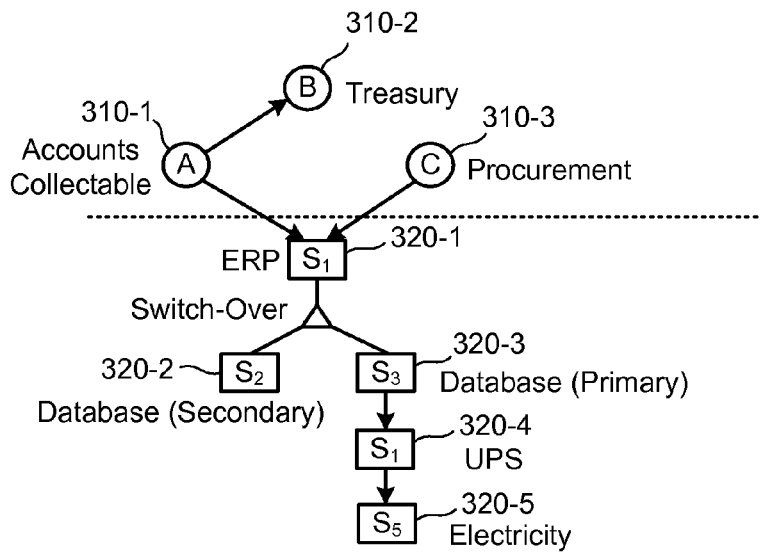
FIG. 3 illustrates an example process model and service dependency model according to an embodiment.

FIG. 3 illustrates an example process model and service dependency model according to an embodiment. FIG. 3 illustrates a sample use case having three business processes and five services. However, it is understood that the example embodiments encompass any number and type of business processes and services.

FIG. 3 illustrates a process model having three processes 310—process 310-1 (e.g., Accounts Collectable A), process 310-2 (e.g., Treasury B) and process 310-3 (Procurement C). The output of process 310-1 is input to the process 310-2, where the process 310-3 has no relationship with process 310-1 or process 310-2.

Also, FIG. 3 illustrates a service dependency model having five services—service 320-1 (Enterprise Resource Planning (ERP) $S_1$), service 320-3 (primary database service S3), service 320-2 (secondary database service S2), service 320-4 (an Uninterruptible Power Supply (UPS) S4) and service 320-5 (electricity S5). The service 320-1 may be referred to as a top-level service. For example, the service 320-1 is directly consumed by processes 310-1 and 310-3.

In this example, the top-level service 320-1 depends on a high-available database service. The service 320-3 (primary database service S3) is backed-up by the service 320-2 (a secondary, externally hosted database service S2). The secondary database service would be used if the primary database service is not available. The service 320-1 is unavailable if both database services S2 and S3 are not available. The service 320-1 is available if at least one of the database services S2 or S3 is available. The service 320-3 itself depends on electricity, which is provided by the service 320-5, and the service 320-4 operates as a buffer between the actual electricity provider and the database services.

Figure 4:
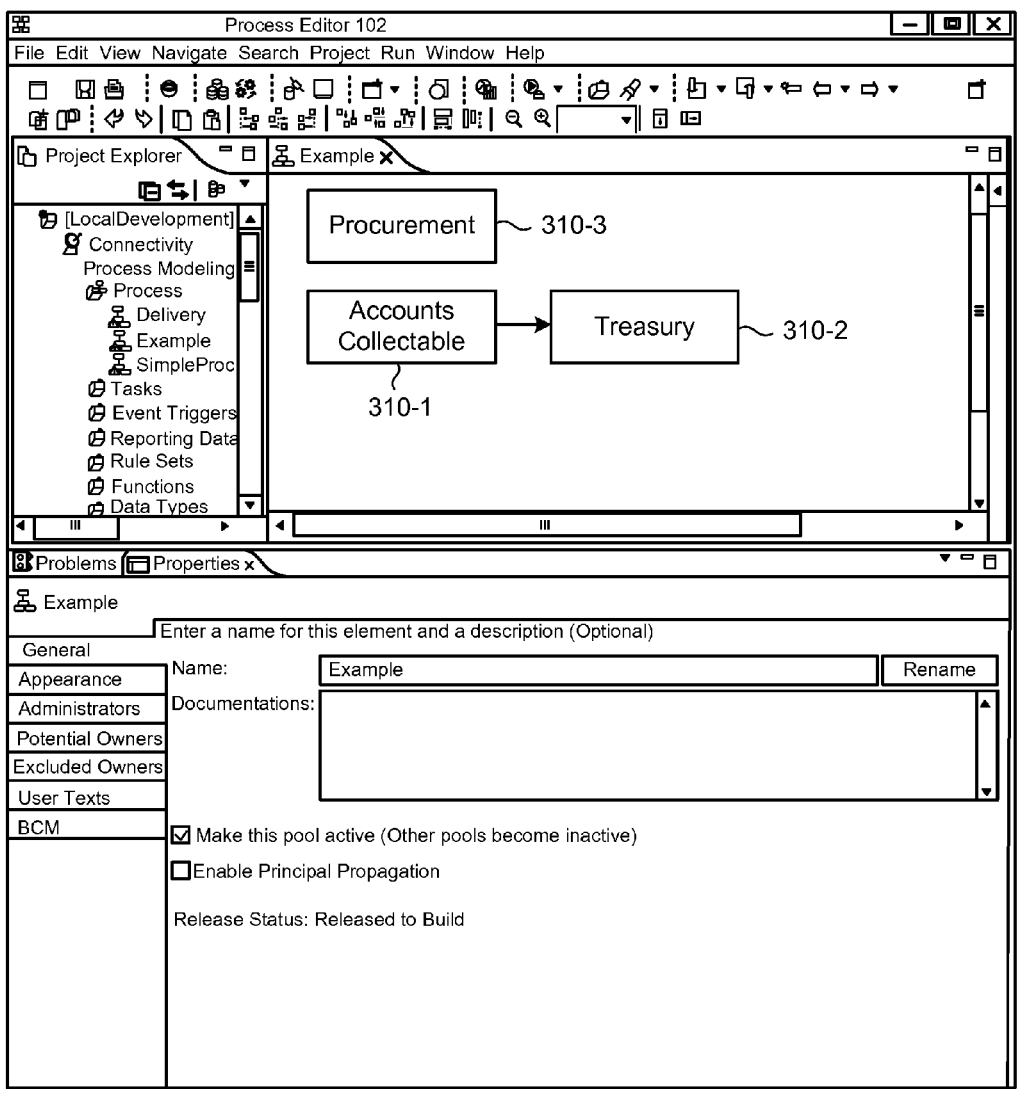
FIG. 4 illustrates an example user interface of a process editor for creating a process model according to an embodiment.

FIG. 4 illustrates an example user interface of the process editor 102 for creating the process model according to an embodiment. Referring to FIG. 4, the user may operate the user interface in order to develop the process model. In this case, the process model generator 104 generated the process model for the processes in the use case of FIG. 3 based on information received from the user. As shown on the user interface, the process model includes the process 310-1 (e.g., accounts collectable) being connected to the process 310-2 (e.g., treasury), and the process 310-3 (procurement). The user may manipulate the user interface of FIG. 4 in order to add, delete, and/or change the arrangement of the business processes 310, and the process model generator 104 generates the process model based on the user's command using via the user interface of FIG. 4.

Figure 5:
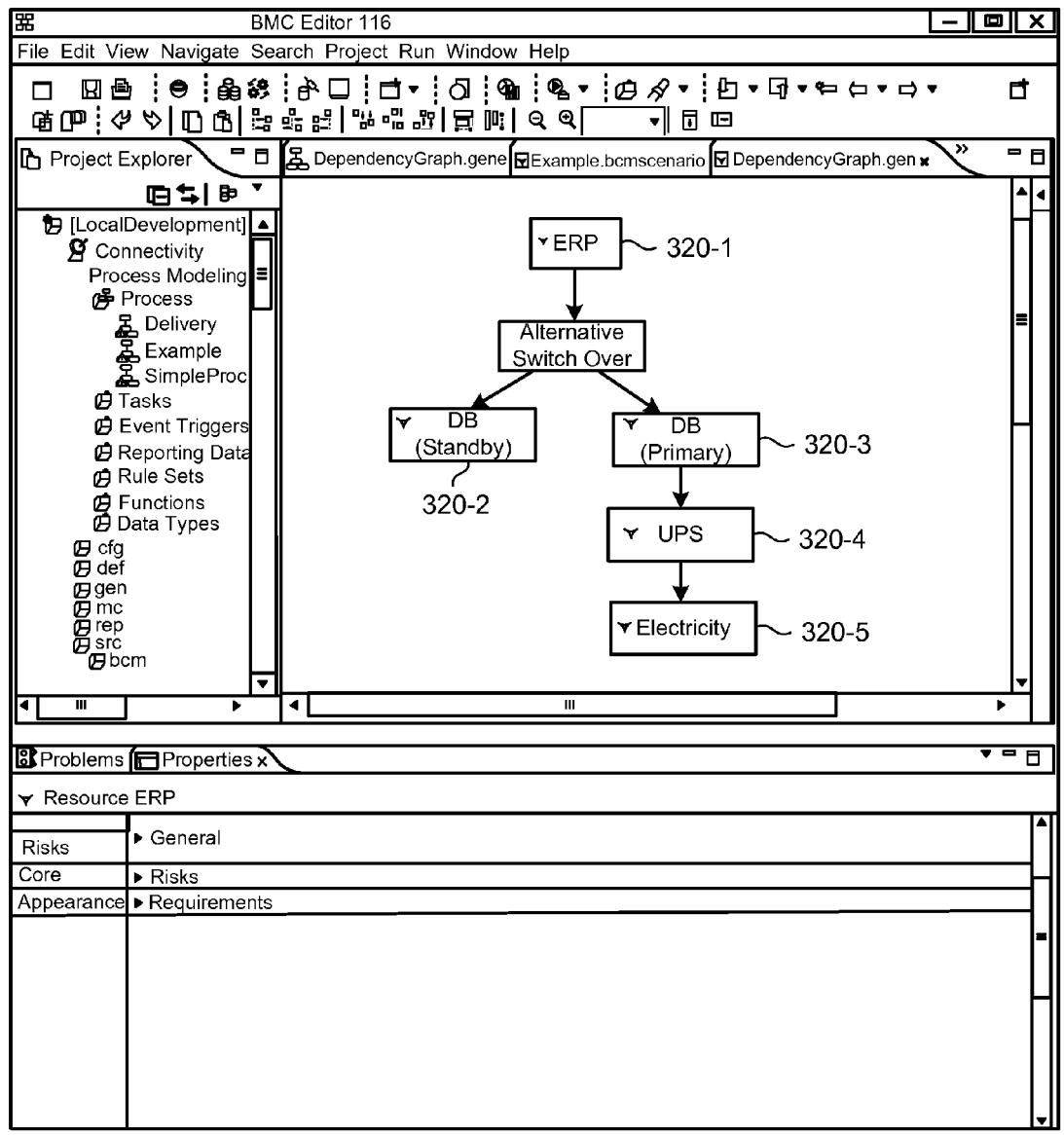
FIG. 5 illustrates an example user interface of a business continuity manager (BCM) editor for creating a service dependency model according to an embodiment.

FIG. 5 illustrates an example user interface of the BCM editor 116 for creating the service dependency model according to an embodiment. As shown in FIG. 5, the user may manipulate the user interface of FIG. 5 in order to add, delete, and/or change the arrangement of the services 320, and the dependency model generator 118 may generate the dependency model based on the user's commands. In the use case of FIG. 3, the user interface provides the plurality of services 320 that are arranged according to their dependencies. For example, between each service 320, the user may provide a dependency link, which indicates how the services 320 are arranged, and thus dependent on each other. FIG. 5 illustrates the top-level service 320-1, the service 320-2 (e.g., the secondary database), the service 320-3 (e.g., the primary database), the service 320-3 (e.g., the UPS), and the service 320-5 (e.g., electricity service).

As explained above, in order to carry out a business impact analysis, the user has to quantify the business impact if a business process is disrupted. The user has to consider various dimensions, for example legal consequences, financial impact or external damages.

Figure 6:
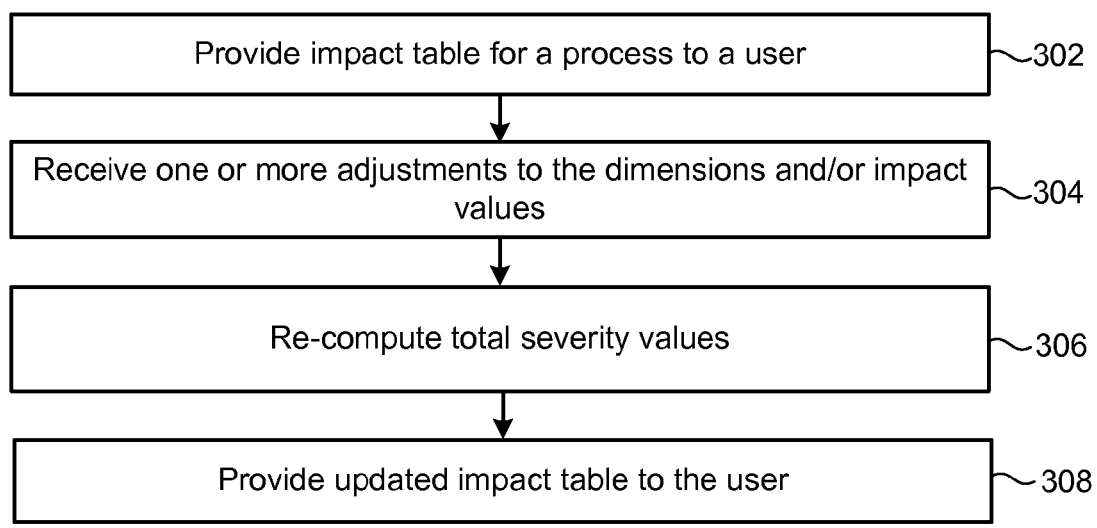
FIG. 6 illustrates a flowchart illustrating example operations for generating an impact table using the data processing apparatus of FIG. 1 according to an embodiment.

FIG. 6 illustrates a flowchart illustrating example operations for generating an impact table using the data processing apparatus 100 of FIG. 1 according to an embodiment. Although FIG. 6 is illustrated as a sequential, ordered listing of operations, it will be appreciated that some or all of the operations may occur in a different order, or in parallel, or iteratively, or may overlap in time.

An impact table for a process may be provided to the user (302). For example, the process table generator 110 may generate an impact table and provide the impact table to the user via the user interface 136. In one example, the process table generator 110 may provide Table 1, identified above, as the impact table for the process 310-1 (e.g., process A). In the example of Table 1, the process table generator 110 generated an impact table having a plurality of time intervals and associated impact categories—financial, legal and external. For each combination of time intervals and impact categories for qualitative categories (e.g., legal and external), the impact table may provide an impact value of NONE, LOW, MEDIUM, HIGH or MEGA. For each combination of time intervals and impact categories for quantitative categories (e.g., financial), the impact table may provide the numerical value associated with its type of category. For instance, referring to the financial impact category, the impact table provides the currency amount.

As explained above, based on the impact values for each particular row in the impact table, the process table generator 110 may provide a total severity value for each time interval, which indicates an expected business impact. For example, the process table generator 110 may calculate a severity value for each impact value in the impact table, and then add the severity values for the impact categories within each time interval to generate the total severity value for each time interval.

To compute the severity value of a quantitative dimension, the process table generator 110 using mapping information that maps value ranges of that dimension to impact values. Depending on the business value of an activity, the mapping information may map the financial impact of $0-$99.99 to NONE, $100-$999.99 to LOW and so on. According to one embodiment, the process table generator 110 may compute the severity value of a qualitative dimension entry based on mapping rules, as explained below. For example, if it is assumed that there are x quantitative and qualitative dimensions in the impact table, the process table generator 110 generates the severity values based the following mapping rules: NONE=0, LOW=1, MEDIUM=x*LOW+1, HIGH=x*MEDIUM+1 and MEGA=x*HIGH+1.

After each severity value within a row is calculated, the process table generator 110 generates the total severity value by summing the severity values across the impact categories. The mapping rules may ensure that a row with a single HIGH entry always has a higher total severity value than a row where all entries are MEDIUM.

In the example of Table 1, x=3 because there are three impact categories or dimensions (e.g., finance, legal, external). Therefore, the process table generator 110 determines the following mapping rules: NONE=0, LOW=1, MEDIUM=4, HIGH=13, and MEGA=40. The financial impact of $1,000 may be mapped to MEDIUM. As a result, the total severity value of row two in Table 1 evaluates MEDIUM+LOW+LOW, which provides a total severity value of 6. The process table generator 110 may provide the generated impact table for process 310-1 (e.g., process A).

One or more adjustments to the dimensions and/or impact values may be received (304). For example, the process table generator 110 may receive information from the user, which changes one or more of the dimensions and/or one or more impact values.

Total severity values may be re-computed based on the updated information (306). For example, the process table generator 110 may re-compute the severity values based on the updated information. If the user adds or deletes an impact category, the process table generator 110 may update the mapping rules and then re-calculate the total severity values.

An updated impact table may be provided to the user (308). For example, the process table generator 110 may provide the updated impact table to the user via the user interface 136.

Figure 7:
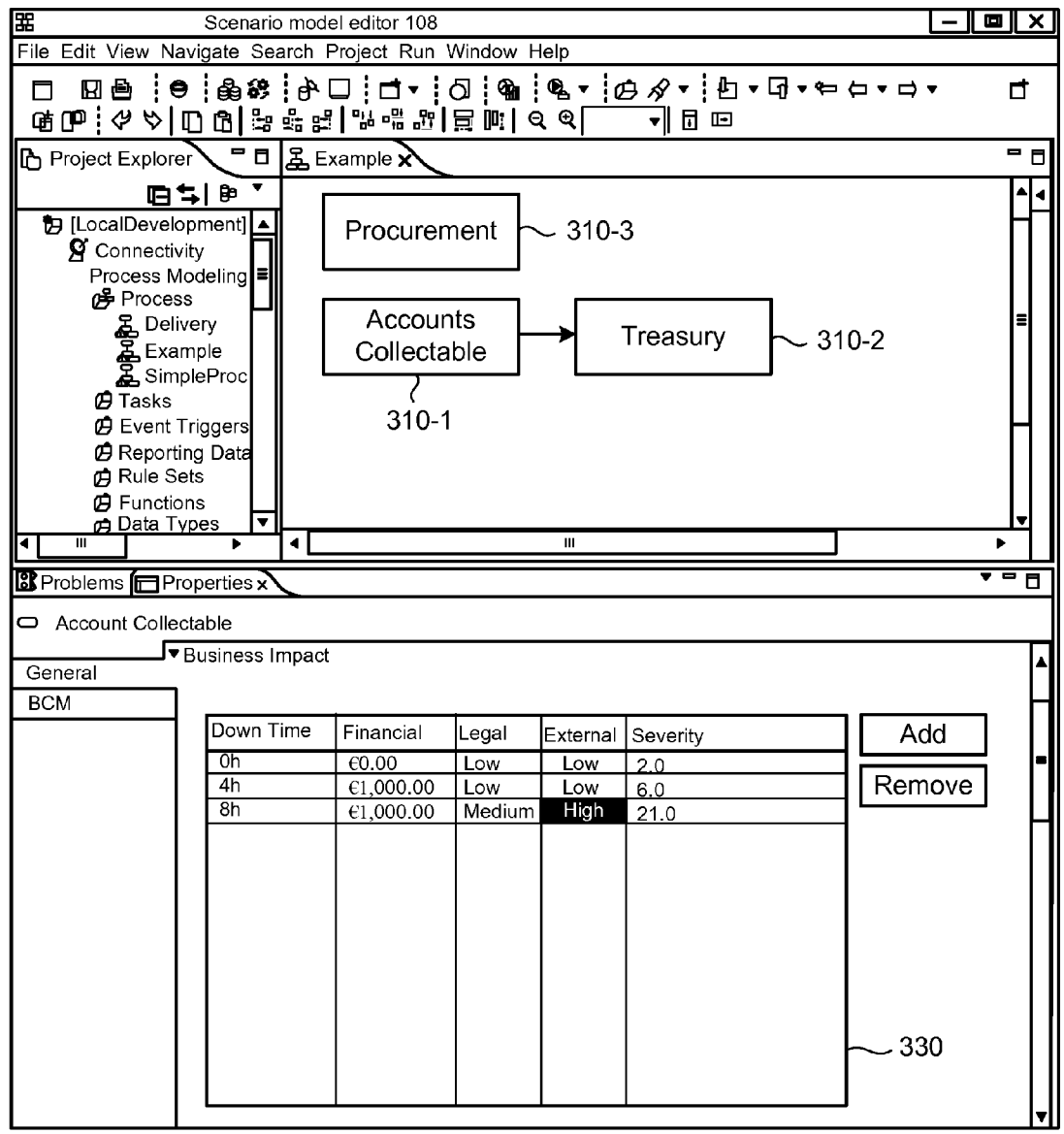
FIG. 7 illustrates an example user interface depicting a process impact table according to an embodiment.

FIG. 7 illustrates an example user interface depicting a process impact table 330 according to an embodiment. For example, the scenario model editor 108 may be configured to provide the process impact table 330 via the user interface 136. As indicated above, the scenario model editor 108 may be an extension of the process editor 102, which the user may select the BCM tab on the user interface, and select one of the business processes 310, thereby permitting the process model generator 104 of the scenario model editor 108 to provide the impact table 330. In the example of FIG. 7, the user has selected the accounts collectable process 310-1 (e.g., process A), which cause the process model generator 104 to display the process impact table 330 corresponding to the accounts collectable process 310-1 (e.g., Table 1). Subsequently, the user may select the procurement business process 310-3 or the treasury business process 310-2 in order to generate and view the impact tables corresponding to these business processes.

Further, business processes may depend on each other. For example, the output of a process may be the input of another process. Once the impact tables for the business processes 310 are generated, dependencies between the business processes 310 may be identified.

Figure 8:
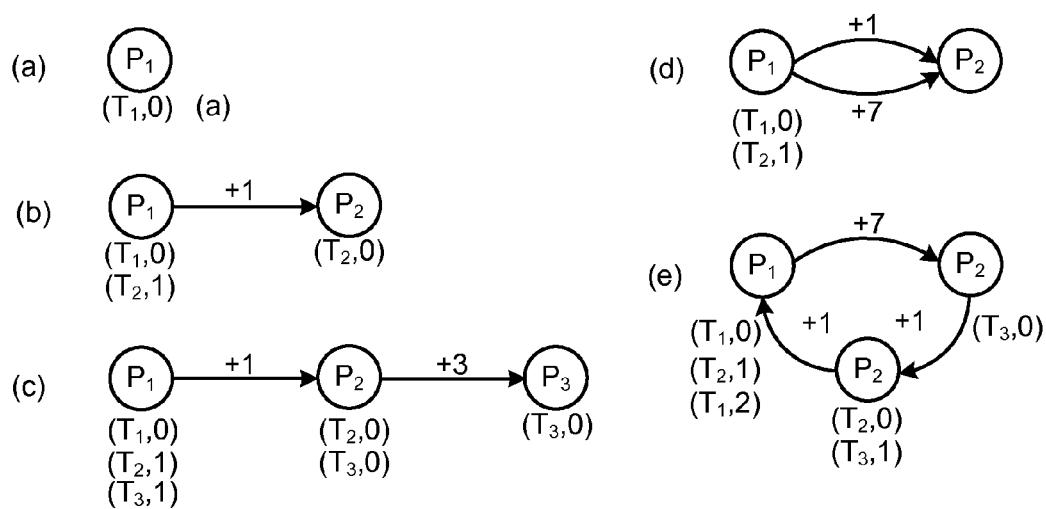
FIG. 8 illustrates graphical representations of the dependencies of business processes according to an embodiment.

FIG. 8 illustrates graphical representations of the dependencies of business processes according to an embodiment. FIG. 8(a) illustrates a business process P1 having an impact table $(T_1, 0)$. The tuple $(T_1, 0)$ indicates that the business process has an impact table $T_1$ with an offset of 0. FIG. 8(b) illustrates a business process P2 being dependent upon the output of the business process P1. The business process P2 includes an impact table $(T_2, 0)$ and the business process P1 includes multiple business impact tables $(T_1, 0)$ and $(T_2, 1)$. For instance, the impact table $T_2$ may be assigned to the business process P1 with an offset of 1, as further described below. FIGS. 8(c), 8(d) and 8(e) illustrate additional variations of the dependencies between business processes P1, P2, and P3, and how the impact tables are assigned to business processes, which account for their dependencies.

Referring to FIG. 8(b), the output of business process P1 is the input for process P2. If the business process P1 is disrupted, the business process P2 may be able to proceed for a certain time, e.g., one hour. This period of time may be referred to as the offset o. Generally, the offset is not a negative value. According to an embodiment, in order to account for the dependency between the business process P1 and the business process P2, the impact table $T_1$ and the impact table $T_2$ may be assigned to the business process P1 and the business process P2, respectively, $(T_1, 0)$ and $(T_2, 0)$. Subsequently, the input arc between the business process P1 and the business process P2 is marked with an offset of 1. Thus, because the business process P2 depends on the business process P1, the impact table of the business process P2 is assigned to the business process P1 with an offset of 1, denoted as the tuple $(T_2, 1)$. As a result, the business process P1 includes two impact tables in its table set $\{(T_1, 0), (T_2, 1)\}$.

Transitive input relationships are handled accordingly. For example, all impact tables of an input arc are assigned to the business process and the additional offset is added to the existing offset. With respect to FIG. 8(c), the impact table of business process P3 is assigned to the impact table set of business process P2 with an offset of 3 and assigned to the impact table set of business process P1 with an offset of 4.

If we have to assign an impact table with an offset $o_1$ that has been already assigned to the business process' table set with an offset $o_2$, the minimum offset min $(o_1, o_2)$ is selected. This solves loops and conflict situations as depicted in FIGS. 8(d) and 8(e). With reference to FIG. 8(e), $(T_3, 7)$ or $(T_3, 2)$ is added to the impact table set of the business process P1. In this case, the minimum offset is selected—$(T_3, 2)$. In a loop situation, the impact table set $\{(T_1, 1), (T_2, 0)\}$ of the business process P2 are assigned to the business process P1 with an offset of 7. However, since the business process P1 already has the tuple $(T_1, 0)$ in its table set, the minimum offset 0 is selected.

Continuing with the use case of FIG. 3, the business process 310-1 (e.g., business process A) is the input to the business process 310-2 (e.g., process B) as shown in FIG. 8(b). However, with respect to this particular example, the offset between business process 310-1 and business process 310-2 is 72 hours. The business impact table for process 310-2 is provided below with respect to Table 4.

TABLE 4

Business Impact Table for Process 310-1 (process A)

| | Down Time (h) | Financial | Legal | External | Total Severity Value |
|---|---|---|---|---|---|
| 1 | 24-infinity | 0.00 | MEGA | MEGA | 80 |

As a result, the business impact table for the business process 310-1 includes two impact tables—Table 1 and Table 4 with an offset of 72 hours.

Figure 9:
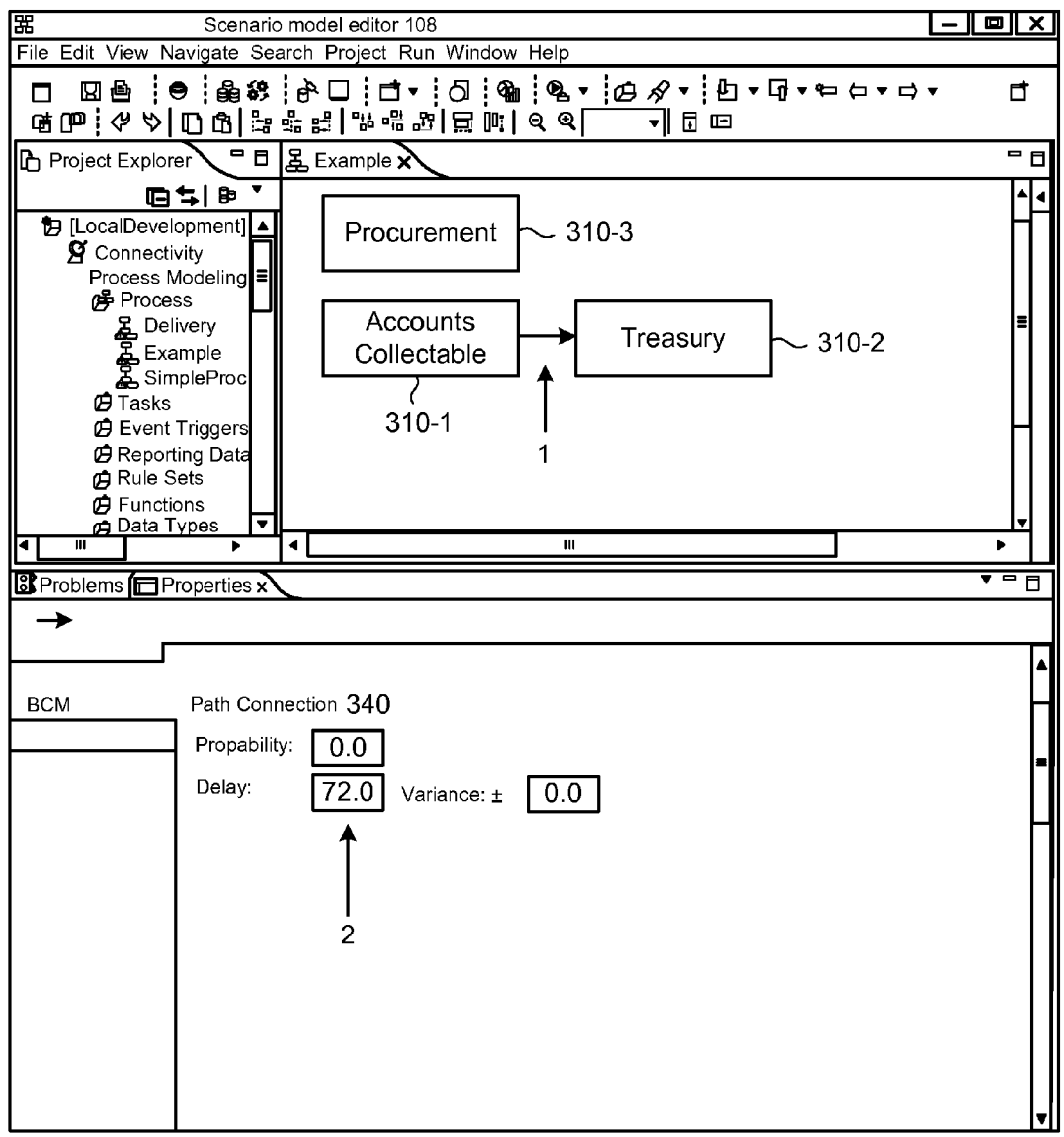
FIG. 9 illustrates an example user interface providing a path connection between a first business process and a second business process according to an embodiment.

FIG. 9 illustrates an example user interface providing a path connection 340 between the business process 310-1 and the business process 310-2 according to an embodiment. For example, using the scenario model editor 108, the user may enter the appropriate offset (also referred to as delay) between the business process 310-1 and the business process 310-2. Also, the user may annotate one or more dependency links between any of the business processes in the process model, and provide the appropriate offset value. Further, the user may enter additional information regarding the dependencies between business processes such as the probability and the variance, as shown in FIG. 9.

Once a complete set of impact tables for each business process 310 is available, the process table generator 110 merges the impact tables into a single impact table for each business process 310. The merged impact table includes the rows from all impact tables with the offset added to the time-span. If impact tables include rows with identical time-frames, the process table generator 110 may add the quantitative entries (e.g. financial entries) together and replace the qualitative entries (e.g. legal entries) with the higher value.

If the time-frames of impact table rows overlap, the process table generator 110 may split the rows into rows with new time-frames such that one or more rows do not overlap and one or more rows become rows with identical time-frames. Subsequently, the process table generator 110 may apply the rules to merge the rows with identical time-frames.

Continuing with the use case, when merging the business impact tables for the process 310-1 (e.g., merging $(T_1, 0)$ and $(T_2, 72)$), the process table generator 110 may add the single 24 hour row from the impact table of business process 310-2 (e.g., Table 4) with an offset of 72 hours. As such, in the first merging step, the business table generator 110 may add the single row of Table 4 with the offset of 72 to the business impact table of the process 310-1 (e.g., Table), which results in the following table:

TABLE 5

Adding the single row from Table 5 to Table 1

| | Down Time (h) | Financial | Legal | Eternal | Severity |
|---|---|---|---|---|---|
| ... | ... | ... | ... | ... | ... |
| 3 | 8-infinity | 1000.0 | MEDIUM | HIGH | 21 |
| 4 | 96-infinity | 0.00 | MEGA | MEGA | 80 |

As shown in Table 5, rows 3 and 4 are overlapping rows. As such, in the next step, the process table generator 100 may split row number 3 into 3' and 3" such that row 3" and 4 have the same time-frame, as shown in the following table:

TABLE 6

Spitting row 3 into 3' and 3"

| | Down Time (h) | Financial | Legal | Eternal | Total Severity Value |
|---|---|---|---|---|---|
| ... | ... | ... | ... | ... | ... |
| 3' | 8-96 | 1000.0 | MEDIUM | HIGH | 21 |
| 3" | 96-infinity | 1000.0 | MEDIUM | HIGH | 21 |
| 4 | 96-infinity | 0.0 | MEGA | MEGA | 80 |

In a last step, the process table generator 110 may merge row 3" and row 4 into a new row 4'. Following the rules of merging rows outlined above, the process table generator 110 may add the financial values of rows 3" and 4 and the new financial value of row 4' becomes $ 1000.00. Because row 4 has higher legal and external impact values than row 3", the process table generator 110 assigns the impact values for the legal and external impact categories for row 4 to new row 4'. Then, the process table generator 110 deletes rows 3" and 4, which results in the final merged impact table for process 310-1 as provided in the following table:

TABLE 7

Merged Impact Table for Process 310-1

| | Down Time (h) | Financial | Legal | Eternal | Severity |
|---|---|---|---|---|---|
| 1 | 0-4 | 0.00 | LOW | LOW | 2 |
| 2 | 4-8 | 1000.0 | LOW | LOW | 6 |
| 3' | 8-96 | 1000.0 | MEDIUM | HIGH | 21 |
| 4' | 96-infinity | 1000.0 | MEGA | MEGA | 82 |

The process table generator 110 may generate merged impact tables for each of the processes in the dependency model.

FIG. 10 illustrates an example user interface providing a merged impact table 350 for the business process 310-1 according to an embodiment. For example, referring to FIG. 10, the process table generator 110 may provide the merged impact table 350 to the user via the interface 136.

After the merged impact tables are generated, the scenario model editor 108 and/or the SLA translator 126 may determine the MTO for each business process. For example, as explained above, using the information from the merged impact tables, the scenario model editor 108 may define the MTO for each business process based on a risk appetite level provided from the user via the user interface 136. Alternatively, the SLA translator 126 may provide a simulation dialog to the user via the user interface 136 for selecting the type of risk appetite level as further explained below.

Continuing with the use case of FIG. 3, the risk appetite may be set to HIGH. Therefore, referring to Table 7 (e.g., the merged impact table for process 310-1), the merged impact table includes three dimensions. When applying the mapping rules as explained above, the value of HIGH is computed as 13. As such, all rows in Table 7 having a total severity value equal to or greater than the risk appetite of 13 are selected, and the MTO is determined as 8 hours. Therefore, the MTO for the process 310-1 is determined as 8 hours. The scenario model editor 108 and/or the SLA translator 126 may determine the MTO for each of the business processes in the same manner.

Subsequently, the service impact tables for the services may be generated based on the merged business impact tables for the business processes. For example, the service table generator 120 may receive the merged business impact tables from the annotated process model database 114, assign the appropriate business impact tables to the services, and merged the assigned impact tables to generate a merged impact table for each top-level service. Then, the MTO for each top-level service may be determined in the same manner as explained with reference to the business processes.

Figure 11:
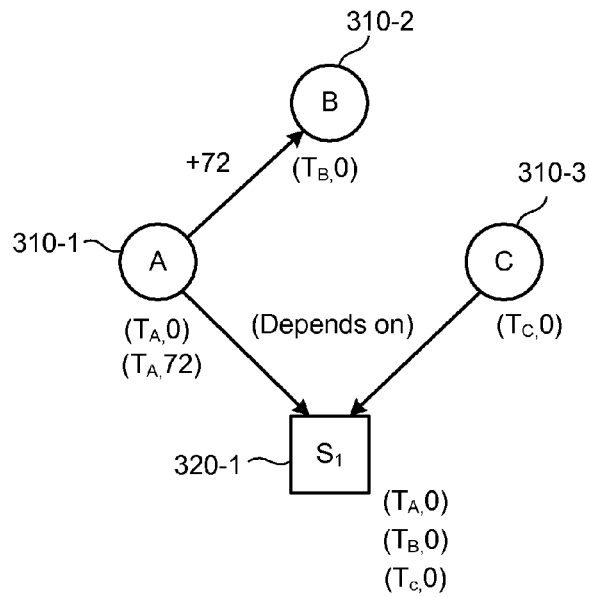
FIG. 11 illustrates an assignment of the impact tables for a top-level service according to an embodiment.

FIG. 11 illustrates an assignment of the impact tables for a top-level service according to an embodiment. As shown in FIG. 11, the business process 310-1 includes an impact table set of $\{(T_A, 0), (T_B, 72)\}$, the business process 310-2 includes an impact table of $(T_B, 0)$, and the business process 310-3 includes an impact table of $(T_C, 0)$. According to an embodiment, the service table generator 120 may assign the impact tables of the business processes that are directly consumed by the top-level service (e.g., process A and process B) to the top-level service (S1), as further explained below.

First, the service table generator 120 assigns all unmerged impact tables to the top level service S1 in a similar way as for merged impact tables, but without applying any offsets. The business impact table for the process 310-3 (e.g., process C) is provided in the following table:

TABLE 8

Business Impact Table for Process 310-3

| | Down Time (h) | Financial | Legal | External | Total Severity Value |
|---|---|---|---|---|---|
| 1 | 6-infinity | 0.0 | MEDIUM | HIGH | 17 |

The table set of the top level service S1 may be $\{(T_A, 0), (T_B, 72), (T_C, 0)\}$. Next, the service table generator 120 may merge the table set for the top level service S1 using the same merging rules applied to the business impact tables. The merged impact table for S1 is provided in the following table:

TABLE 9

Merged Impact Table for the Top-level Service 320-1

| | Down Time (h) | Financial | Legal | Eternal | Total Severity Value |
|---|---|---|---|---|---|
| 1 | 0-4 | 0.00 | LOW | LOW | 2 |
| 2 | 4-6 | 1000.0 | LOW | LOW | 6 |
| 4 | 6-96 | 1000.0 | MEDIUM | HIGH | 21 |
| 5 | 96-infinity | 1000.0 | MEGA | MEGA | 84 |

Based on the information from the top level service 320-1, the MTO for the top-level service may be determined in the same manner as was described with reference to the business processes.

Figure 12:
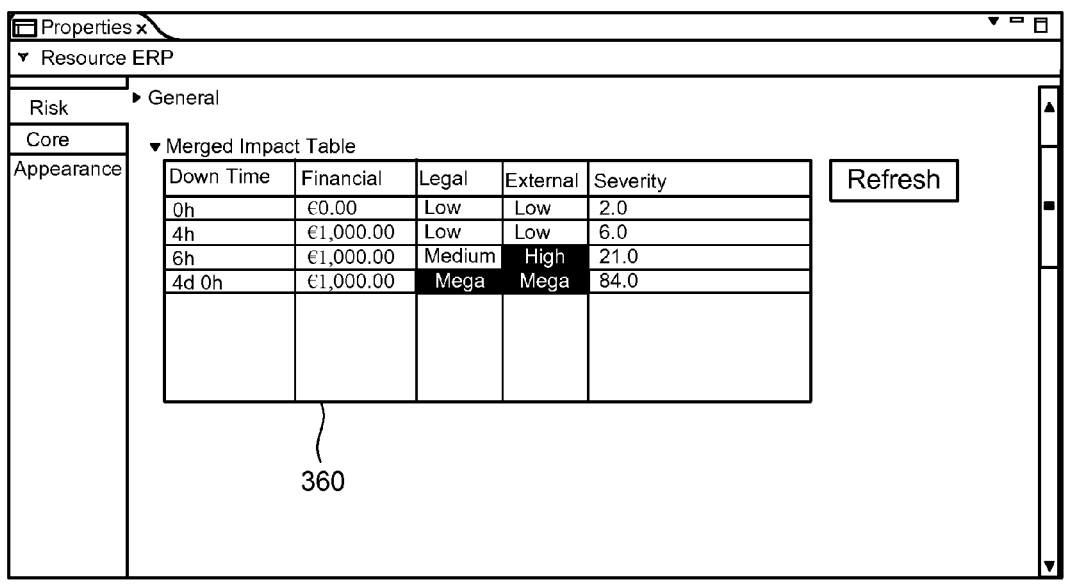
FIG. 12 illustrates an example user interface providing a merged service impact table for the top-level service according to an embodiment.

FIG. 12 illustrates an example user interface providing a merged service impact table 360 for the top-level service 320-1 according to an embodiment. For example, referring to FIG. 12, the service table generator 120 may provide the merged impact table 360 to the user via the interface 136.

As indicated above, the BCM editor 116 also may annotate the dependency graph with risk information and/or recovery information.

Figure 13:
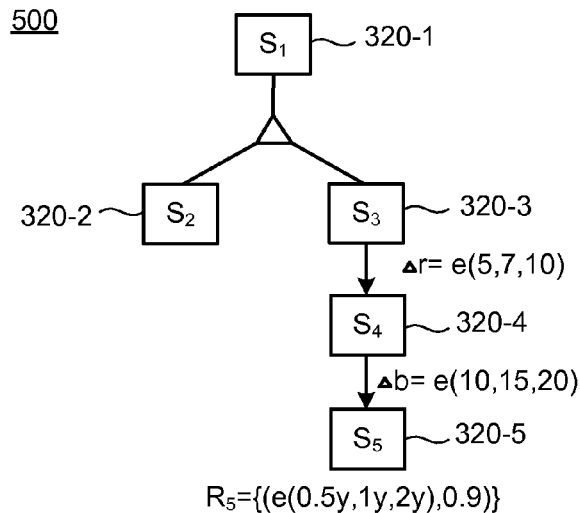
FIG. 13 illustrates a dependency model annotated with risk information, recovery time information, and delay time information according to an embodiment.

FIG. 13 illustrates a dependency model 500 annotated with risk information, recovery time information, and delay time information according to an embodiment. Referring to FIG. 13, the dependency graph provides the plurality of services 320 having a plurality of dependency links. According to an embodiment, the BCM editor 116 may annotate one or more services 320 with risk information and one or more dependency links with one of a recovery time and a delay time. In FIG. 13, the service 320-5 is annotated with risk information of R5=$\{(e(0.5y, 1y, 2y), 0.9)\}$, the dependency link between the service 320-5 and the service 320-4 is annotated with the delay time of $\Delta b = e(10, 15, 20)$, and the dependency link between the service 320-3 and the service 320-4 is annotated with the recovery time of $\Delta r = e(5, 7, 10)$.

As indicated above, the dependency model 500 is a service dependency graph with additional features such as the delay time, recovery time, and risk information. Referring to the use case of FIG. 3, the ERP service (e.g., service 320-1) is using more than a single database service. If one database server fails, the administrator not only has to replay the backup, but also needs to make sure that various databases are synchronized. This recovery time may be referred to as logical error. Even if the database server is operational again, the service may still be unavailable until the administrator resolves the logical errors.

Likewise, services in such a BCM dependency graph may act as buffers. A good example is the Uninterrupted Power Supply (UPS) in the use case of FIG. 3. A UPS operates as a buffer between servers and the electricity provider and is capable of providing power for a certain amount of time when the electricity is disrupted.

As indicated above, the dependency link between the service 320-3 and the service 320-4 is a dependency with recovery time of $\Delta r = e(5, 7, 10)$. Generally, the parameter $e(a, m, b)$ may denote a three point estimate. The three point estimation is a commonly used technique in management to fit a beta-distribution or triangle distribution if little information is available or the estimate is based on human judgment. Further, because the service 310-4 operates as a buffer, the dependency link between the service 320-4 and the service 320-5 may be a dependency with a buffer time of $\Delta b = e(10, 15, 20)$.

Besides recovery times, the BCM editor 116 also annotates a list of risks R to services and the potential failure rate λ each risk imposes on a service. For simplicity, the lambda values discussed in this disclosure are expressed as failures per year. Further, the user may estimate the probability a service provider is able to recover the service in time. The failure list R5={(λ1=(0.5, 1, 2), p1=0.9)}, for the service 320-5 denotes that for the service 320-5 the probability that it will fail rises from very low within half a year through high probability within one year to almost certainty within two years. If that occurs, the service provider is able to recover the service in 90% of all cases within the time constraint.

As indicated above, the SLA builder 122 may receive SLA information from the user via the user interface 136 and create a SLA table associated with one or more services of the dependency model. The user may be interested in evaluating SLAs in order to determine if the SLAs are acceptable. For example, the top-level service may be dependent upon a service such as electricity. In this case, the user may want to evaluate certain SLAs associated the electricity service in order to determine their impact on the dependency model.

Figure 14:
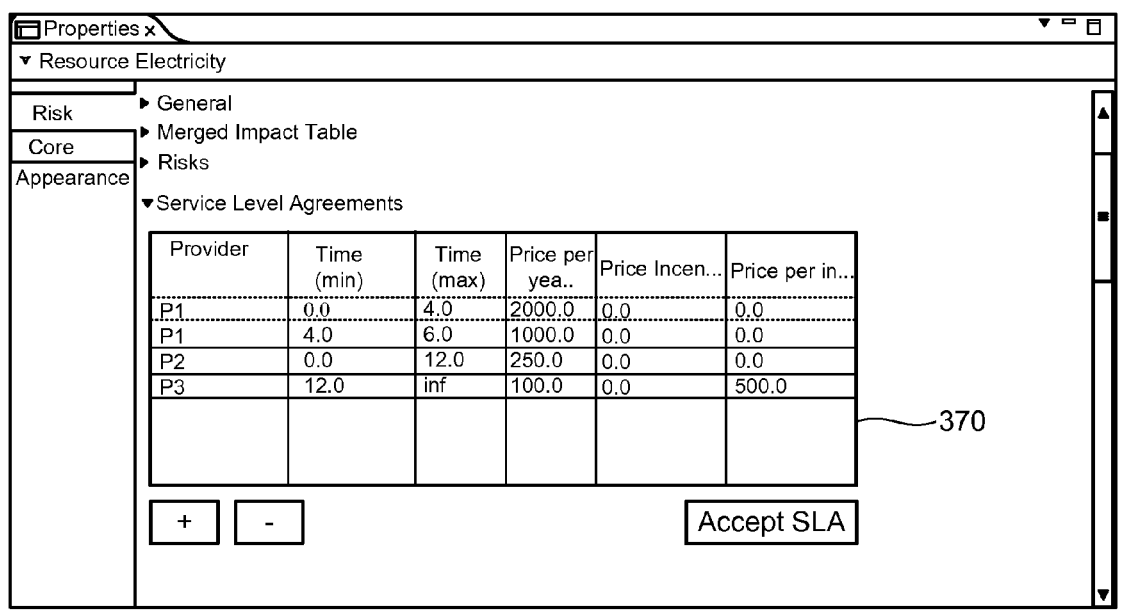
FIG. 14 is an example user interface providing an SLA table according to an embodiment.

FIG. 14 is an example user interface providing an SLA table 370 according to an embodiment. For example, the SLA builder 122 may receive information from the user in order to build the SLAs in the SLA table 370. The SLA table 370 reflects the information illustrated in Table 3 above. In the case of FIG. 14, the user has entered five SLAs in the SLA table 370. With respect to each SLA, the SLA table 370 provides a name of the provider (e.g., P1, P2, P3), time constraint information (e.g., minimum time and maximum time), a price per year, price incentive information, and optionally a price per incident. The time constrain information relates to recovery times that the service provider has estimated or agreed when the service is disrupted. Price per year denotes the cost to subscribe to that SLA per year regardless if the service fails or not. Price incentive is an additional bonus which is paid to the provider if the service does not fail once within that year. Price per incident is the cost the service user has to pay to the provider if a service needs to be recovered. Penalty costs are the cost the service provider pays the service customer every time a service fails.

In the SLA table 370, external and internal services are not explicitly distinguished. External services may refer to services provided by providers outside the company, and internal services may refer to services provided by the company itself. However, the embodiments encompass any type of variation to the SLA table 370 that accounts for the differences between internal services and external services. The major difference between external and internal services is the cost associated with the SLAs. External services and service recovery operations are likely to be charged, while internal services are internally charged. Therefore, it may be difficult to quantify the additional costs. Without associated cost with a SLA, the SLA translator 126 would prefer services that are essentially free of cost. Therefore, in order to compensate for internal services, the SLA table 370 may include a category that associates hidden costs such as an administrator as a service provider for the interval services.

Based on the SLA table 370, the process model annotated with merged business impact tables, the dependency model annotated with the merged service impact tables, the risk information and recovery time information, the SLA translator 126 may generate the BEAM and simulate the BEAM for a selected number of service level agreements in order to determine whether one or more selected service level agreements would provide sufficient recovery support and the MTOs for top-level services or business processes are not violated.

Figure 15:
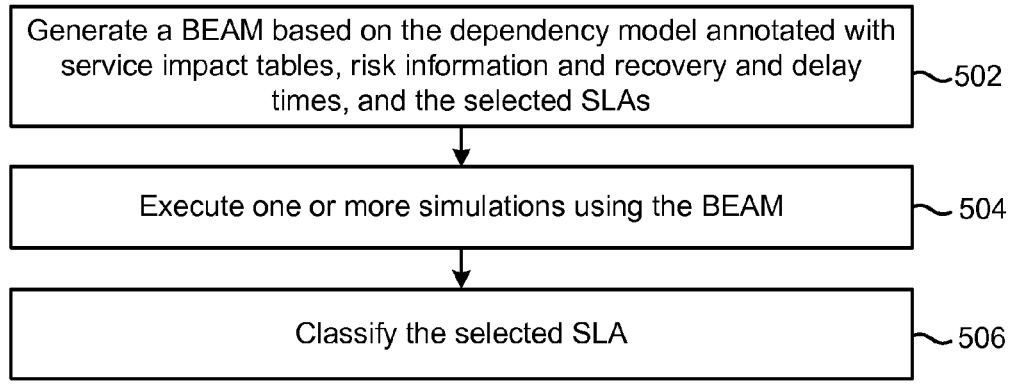
FIG. 15 is a flowchart illustrating example operations of an SLA translation using the data processing apparatus of FIG. 1.

FIG. 15 is a flowchart illustrating example operations of an SLA translation using the data processing apparatus 100 of FIG. 1. Although FIG. 15 is illustrated as a sequential, ordered listing of operations, it will be appreciated that some or all of the operations may occur in a different order, or in parallel, or iteratively, or may overlap in time.

Initially, the user may select one or more of the SLAs provided in the SLA table 370 for simulation. For example, the SLA translator 126 may provide a simulation dialog to the user via the user interface 136. The simulation dialog may provide the start time and the end time, as well as the number of simulation runs. Further, the simulation dialog may provide a number of risk appetite levels for selection.

A Behavior Analysis Model (BEAM) may be generated based on the dependency model annotated with service impact tables, risk information and recovery and delay times and the selected SLAs (502). For example, the BEAM generator 128 may generate the BEAM based on dependency model annotated with service impact tables, risk information and recovery and delay times and the selected SLAs.

In one embodiment, the BEAM may be a Petri-Net model. In general, a Petri net refers to a known modeling language or technique in which arcs (direct arcs) may run between "places" (such as a places 630, 625) and "transitions" (such as a transitions 615, 620), where the transitions are referred to as having either "input places" (if leading to a transition by way of an arc) or "output places" of the transition (if receiving an arc from a transitions). Such Petri nets may be used, for example, to provide state-based model(s) of actions associated with workflow processing or other service-based processes. The places of the Petri net may contain tokens (such as a place with token 625), where, in BPEL, and in other contexts and languages, activation of branches or activities may be referenced or described as passing or routing a control token(s)), so that transitions may be said to respond to input tokens by "firing," where an enabled transition may fire if there are tokens in each input place of the transition. When firing, a transaction uses tokens from its input places, executes any associated processing, and puts tokens into the various output places.

Figure 16:
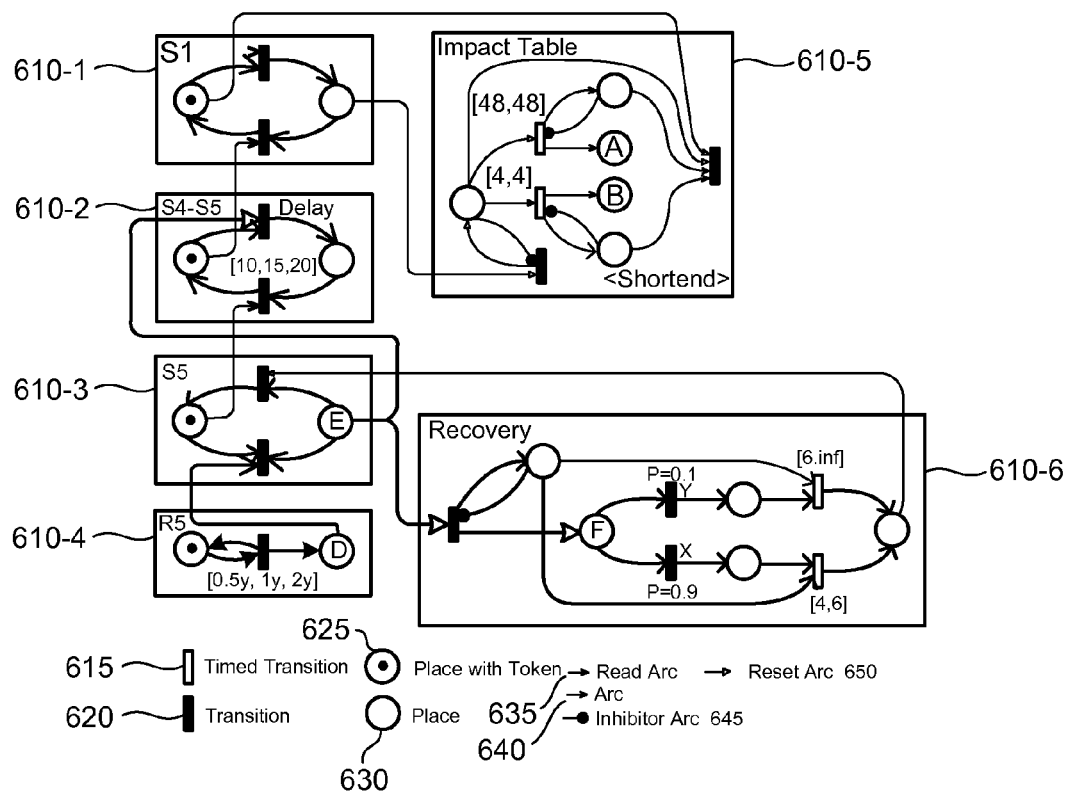
FIG. 16 illustrates a Petri-Net behavior analysis model according to an embodiment.

FIG. 16 illustrates a Petri-Net BEAM 600 according to an embodiment. Generally, the BEAM generator 128 transforms each source model object of the dependency graph (e.g., services, dependency between services, risk information, recovery information, service impact tables) into a BEAM pattern 610 according to predefined transformation patterns. In other words, the BEAM generator 128 generates one or more patterns based on one or more of the services, dependencies between services, risk information, recovery and delay information, service impact tables, and selected SLAs. In particular, referring to FIG. 16, the BEAM generator 128 may generate a BEAM pattern 610-1 for the top-level service 320-1, and a BEAM pattern 610-5 for the service impact table of the top-level service 320-1. Also, the BEAM generator 128 may generate a BEAM pattern 610-2 for the dependency link (e.g., the delay time) between the service 320-4 and the service 320-5, and a BEAM pattern 610-3 for the service 320-5. Further, the BEAM generator 128 may generate a BEAM pattern 610-6 for the time constraint information for the selected SLA (e.g. in the case of FIG. 16, the $2^{nd}$ SLA was selected from service level agreement table 370) and a portion of the risk information (e.g. the probability information), and a BEAM pattern 610-4 for a portion of the risk information (e.g. the failure rate). For simplicity, the Petri-net BEAM 600 illustrates only a portion of the BEAM for the entire dependency model 500 of FIG. 13. However, the BEAM generator 128 of the embodiments may be extended to generate BEAM patterns for any number of model objects including the process impact tables or any other information associated with a business impact analysis.

Each BEAM pattern includes one or more of a timed transition 615, transition 620, a place with token 625, a place 630, a read arc 635, an arc 640, an inhibitor art 645, and a reset arc 650. The functions of each of these components of the Petri-Net model are well known to one of ordinary skill in the art.

Referring to the BEAM pattern 610-5, place B represents the second row in the merged service impact table for service 310-1 and place A represents the fourth row in the merged service impact table or service 310-1. Furthermore, as explained above, the user may have selected the risk appetite level of HIGH. As such, the total severity value for the fourth row is considered to be over the MTO. As a result, the simulator 130 identifies place A as a violation place. If the simulator 130 places a token in place A, the violation is considered major. Although only two rows are represented in the BEAM pattern 610-5, the embodiments encompass the situation where each row of the service impact table is represented.

Referring back to FIG. 15, one or more simulations may be executed using the BEAM (504). For example, the simulator 130 may simulate the BEAM over the period of time and according to a number of simulation runs provided by the user via the simulation interface. During the simulation, the simulator 130 may determine one or more violation for the selected SLA. For example, the simulator 130 may determine the number of times the top-level service 320-1 is unavailable over the period of time. Also, the simulator 130 may determine a number of times the time constrain information is violated for one or more time intervals of the service impact table. For example, referring to FIG. 16, the simulator 130 may count the number of times the time constraint information was violated for place A and place B in the BEAM pattern 610-5. For example, every time a token is placed into the place A or place B, the simulator 130 may record a time constrain violation. Because place A is identified as a violation place, any tokens placed into place A will be identified as major. A sample simulation is explained below.

First, the timed-transition in the BEAM pattern 610-4 fires during a given time interval and a token in created in place D. This triggers the unavailable transition (e.g., place E) of the BEAM pattern 610-3 and the simulator 130 places a token into the unavailable place E of the BEAM pattern 610-3. For instance, a token in place E indicates that the service 310-5 (S5) is unavailable. Further, a token in the unavailable place of BEAM pattern 510-3 enables two transitions: the delay transition of the BEAM pattern 610-2 and the SLA recovery trigger transition of the BEAM pattern 610-6. The trigger recovery transition of the BEAM pattern 610-6 places a token in place F. As a result, the two transitions X and Y compete for that token. Assuming that the transition X with p=0.9 wins, the simulator 130 enables the timed transition that fires during the time interval [4:6] and recovers the service 310-5 (S5). The timed transition that would have made the dependency pattern unavailable is now disabled. The recovery was within the time constraints so the failure was not propagated to the top-level S1 service (no major violation marking). In this example, the selected SLA would be classified as a capable SLA, as further explained below.

Referring back to FIG. 15, the selected SLA is classified (506). For example, the SLA classifier 132 may classify the selected SLA based on the number of violation and the type of violations (e.g., major or minor). Also, the SLA classifier 132 may classify the selected SLA among a plurality of categories such as incapable SLAs, capable SLAs, satisfactory SLAs, and optimal SLAs.

The SLA classifier 132 may classify an SLA as an incapable SLA if the SLA is not able to recover a service within a given time constraint, and at least one major violation is determined. The SLA classifier 132 may classify an SLA as a capable SLA if the SLA is able to achieve a recovery within the given time constraint and prevents a failure propagation to a top-level service. However, a capable SLA does not necessarily guarantee recovery or failure prevention in all cases, that is in some simulation runs the simulator 130 may determine a top-level violation. The SLA classifier 132 may classify an SLA as a satisfactory SLA if the capable SLA has a residual risk equal to or lower than a predefined residual risk threshold. For example, the user may state that a recovery must be successful in 90.0% of all cases, which the residual risk threshold would be set to 10.0%. As such, the SLA classifier 132 may classify an SLA as satisfactory if the simulator 120 determines violations in less than 10% of all simulation runs.

If the SLA classifier 132 classifies more than one SLA as satisfactory for a service, the SLA classifier 132 may rank the satisfactory SLA according to some other criteria such as cost. Therefore, the SLA classifier 132 may list (or choose) the satisfactory SLA with the minimum costs.

The SLA translator 126 may store the results of the simulation and the classification in the results table database 134. Further, the SLA translator 126 may display the results on the user interface 136. The user interface 136 may arrange the selected SLAs according to their classification and/or their rank. For example, SLAs classified as capable may be presented before the SLAs classified as incapable, and the optimal SLA may be presented first. Also, the user interface 136 may display the simulation results indicating the number and type of violations.

Figure 17:
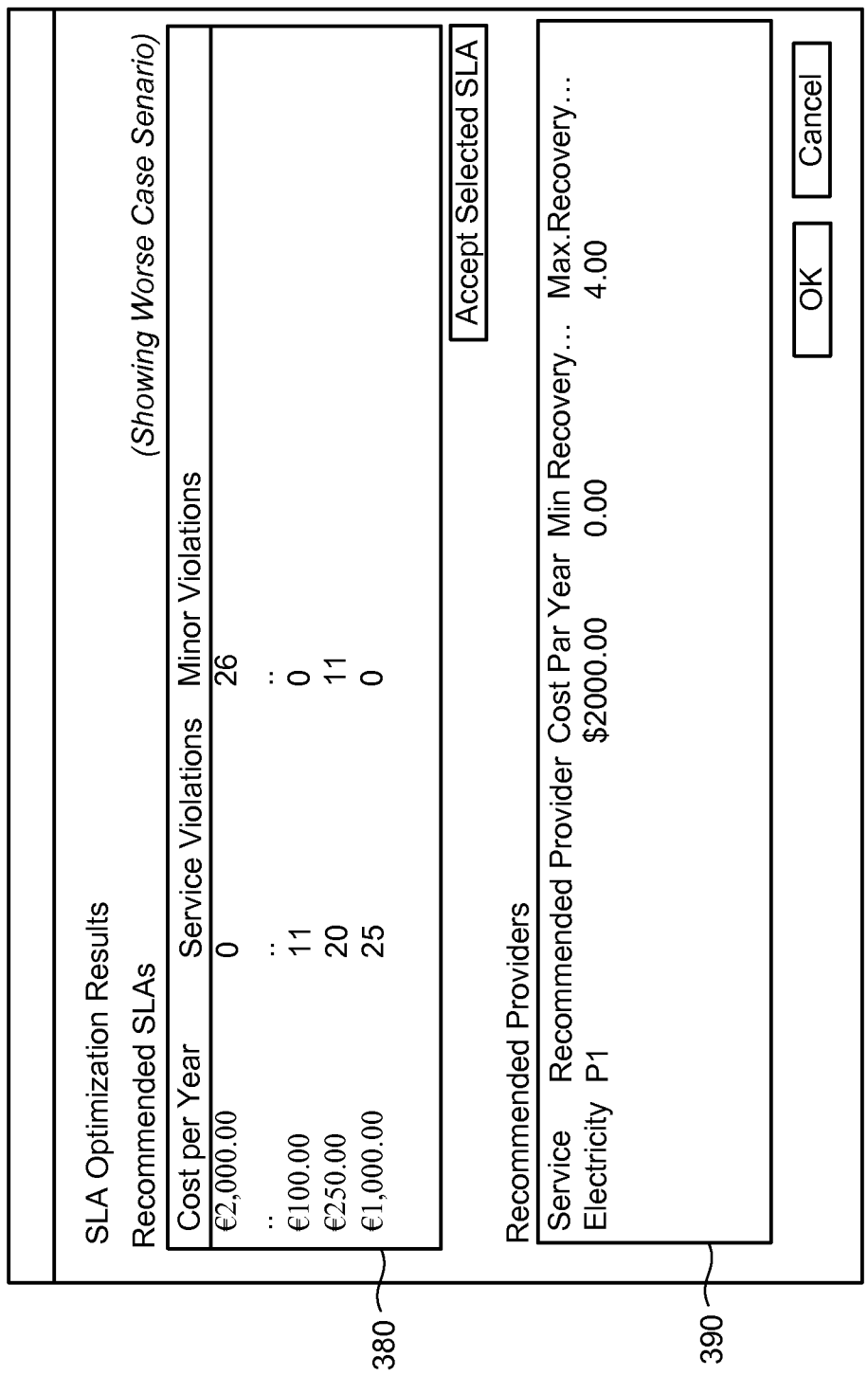
FIG. 17 illustrates an example user interface providing simulation results and a list of recommended providers according to an embodiment.

FIG. 17 illustrates an example user interface providing simulation results 380 and a list of recommended providers 390 according to an embodiment. For example, the SLA translator 126 may provide the simulation results 380 and the list of recommend providers 390 to the user via the user interface 136. Referring to FIG. 17, the simulation results 380 provide the results for each of the selected SLAs. In the example of FIG. 17, the simulation results 380 are provided for the SLAs of the SLA table 370. The SLAs may be provided according to their rank. For instance, the SLA translator 126 may provide the selected SLAs according to the order of optimal SLAs, satisfactory SLAs, capable SLAs and incapable SLAs. As indicated above, the optimal SLAs may include one of the satisfactory SLAs and capable SLAs that are ranked according to their cost (e.g., from least expensive to most expensive). Because the first SLA is the only service level agreement classified as capable (e.g., no severe violations), the SLA translator 126 separates the first SLA from the other SLAs. In addition, the simulation results 380 may provide the number of major and minor violations for each selected SLA.

Also, the user interface may provide the list of recommended providers 390. The list of recommended providers 390 correspond to the providers of the SLAs that are classified as satisfactory or capable. Further, the list of recommended providers 390 may provide more detailed information regarding their respective SLAs such as the cost per year, time constrain information (e.g., minimum and maximum recovery times).

Therefore, the data processing apparatus 100 may assist the user in conducting a business impact analysis in order to determine whether one or more selected service level agreements would provide sufficient recovery support and the MTOs for top-level services or business processes are not violated.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A data processing apparatus for conducting a business impact analysis for a service oriented architecture (SOA) that includes a plurality of processes and services, the data processing apparatus comprising:
    at least one processor;
    non-transitory computer-readable storage medium including instructions executable by the at least one processor, the instructions configured to implement,
    a process table generator configured to generate a first impact table for a first process and a second impact table for a second process;
    a service table generator configured to generate a service impact table for a top-level service by merging the first impact table and the second impact table, the top-level service including the first process and the second process, each of the first impact table, the second impact table and the service impact table having at least one time interval and at least one impact category;
    a dependency model generator configured to generate a dependency model arranging the plurality of services with dependency links, at least one service of the dependency model being annotated with risk information associated with the at least one service;
    an analysis model generator configured to receive a selected service level agreement and convert the service impact table, the dependency model and the selected service level agreement into a Behavior Analysis Model (BEAM) using defined transformation patterns, the selected service level agreement including at least time constraint information, the BEAM including simulation patterns corresponding to the selected service level agreement, the service impact table, and the dependency model;
    a simulator configured to simulate the BEAM over a period of time including determining one or more violations for the at least one service for the selected service level agreement; and
    a service level agreement classifier configured to classify the selected service level agreement based on the one or more violations.

2. The data processing apparatus of claim 1, wherein each of the first impact table, the second impact table and the service impact table provides a total severity value for each time interval, the total severity value indicating an expected business impact for a respective time interval, each impact table providing an impact value for each impact category within each time interval.

3. The data processing apparatus of claim 2, wherein the process table generator is configured to generate the first impact table and the second impact table, and the service table generator is configured to generate the service impact table includes:
calculating a severity value for each impact value in a respective impact table; and
summing the severity values for the at least one impact category within each time interval to generate the total severity value for each time interval.

4. The data processing apparatus of claim 1, wherein the process table generator is configured to generate the first impact table includes:
generating a third impact table corresponding to a third process, the third process being dependent upon an output of the first process, the third process being associated with an offset value, the offset value indicating a period of time that the third process is able to proceed without disruption when the output of the first process is unavailable;
adjusting one or more time intervals for the third impact table by the offset value;
assigning the third impact table having the adjusted time intervals to the first process; and
merging the first impact able and the third impact table having the adjusted time intervals to generate the first impact table for the first process.

5. The data processing apparatus of claim 1, wherein the service table generator is configured to generate the service impact table includes:
assigning the first impact table and the second impact table to the top-level service; and
merging the first impact table and the second impact table to generate the service impact table.

6. The data processing apparatus of claim 1, wherein the risk information includes a failure rate and a probability rate that a service provider is able to recover the at least one service.

7. The data processing apparatus of claim 1, wherein at least one dependency link of the dependency model is annotated with one of a recovery time and delay impact time.

8. The data processing apparatus of claim 1, wherein the BEAM is a petri-Net model and the analysis model generator is configured to generate the BEAM includes:
generating the simulation patterns based on the defined transformation patterns specifying a manner in which data is converted into the petri-Net model, the simulation patterns including a first simulation pattern corresponding to the service impact table, a second simulation pattern corresponding to the risk information, third simulation patterns corresponding to the plurality of services, and a fourth simulation pattern corresponding to the time constrain information of the selected service level agreement, wherein the petri-Net model includes an arrangement of the simulation patterns.

9. The data processing apparatus of claim 1, wherein the simulator configured to simulate the BEAM includes:
determining a number of times the top-level service is unavailable over the period of time;
determining a number of times the time constraint information is violated for one or more time intervals of the service impact table; and
determining a type of violation based on whether the total severity associated with a respective time interval is above a threshold level.

10. The data processing apparatus of claim 9, wherein the service level agreement classifier is configured to classify the selected service level agreement includes:
classifying the selected service level agreement based on the number and type of violations.

11. A method for conducting a business impact analysis for a service oriented architecture (SOA) that includes a plurality of processes and services, the method comprising:
generating a first impact table for a first process and a second impact table for a second process;
generating a service impact table for a top-level service by merging the first impact table and the second impact table, the top-level service including the first process and the second process, each of the first impact table, the second impact table and the service impact table having at least one time interval and at least one impact category;
generating a dependency model arranging the plurality of services with dependency links, at least one service of the dependency model being annotated with risk information associated with the at least one service;
receiving a selected service level agreement, the selected service level agreement including at least time constraint information;
converting the service impact table, the dependency model, and the selected service level agreement into a Behavior Analysis Model (BEAM) using defined transformation patterns, the BEAM including different simulation patterns corresponding to the time constraint information of the selected service level agreement, the service impact table, the risk information, and the dependency model, respectively;
activating the simulation patterns over a period of time including determining one or more violations for the at least one service for the selected service level agreement; and
classifying the selected service level agreement based on the one or more violations.

12. The method of claim 11, wherein each of the first impact table, the second impact table and the service impact table provides a total severity value for each time interval, the total severity value indicating an expected business impact for a respective time interval, each impact table providing an impact value for each impact category within each time interval.

13. The method of claim 12, wherein generating the first impact table, the second impact table, and the service impact table includes:
calculating a severity value for each impact value in a respective impact table; and
summing the severity values for the at least one impact category within each time interval to generate the total severity value for each time interval.

14. The method of claim 11, wherein generating the first impact table includes:
generating a third impact table corresponding to a third process, the third process being dependent upon an output of the first process, the third process being associated with an offset value, the offset value indicating a period of time that the third process is able to proceed without disruption when the output of the first process is unavailable;
adjusting one or more time intervals for the third impact table by the offset value;

assigning the third impact table having the adjusted time intervals to the first process; and merging the first impact able and the third impact table having the adjusted time intervals to generate the first impact table for the first process.

15. The method of claim 11, wherein generating the service impact table for the top-level service includes:

assigning the first impact table and the second impact table to the top-level service;

merging the first impact table and the second impact table to generate the service impact table.

16. The method of claim 11, wherein determining one or more violations includes:

determining a number of times the top-level service is unavailable over the period of time;

determining a number of times the time constraint information is violated for one or more time intervals of the service impact table;

determining a type of violation based on whether the total severity associated with a respective time interval is above a threshold level.

17. The method of claim 16, wherein the classifying the selected service level agreement includes:

classifying the selected service level agreement based on the number and type of violations.

18. A non-transitory computer-readable medium storing instructions that when executed cause one or more processors to perform a process, the instructions comprising instructions to:

generate a first impact table for a first process and a second impact table for a second process;

generate a service impact table for a top-level service by merging the first impact table and the second impact table, the top-level service including the first process and the second process, each of the first impact table, the second impact table and the service impact table having at least one time interval and at least one impact category;

generate a dependency model arranging the plurality of services with dependency links, at least one service of the dependency model being annotated with risk information associated with the at least one service;

receive a selected service level agreement, the selected service level agreement including at least time constraint information;

convert the service impact table, the dependency model, and the selected service level agreement into a petri-Net model using defined transformation patterns, the BEAM including different simulation patterns corresponding to the time constraint information of the selected service level agreement, the service impact table, the risk information, and the dependency model, respectively;

simulate the petri-Net model over a period of time including determining one or more violations for the at least one service for the selected service level agreement; and classify the selected service level agreement based on the one or more violations.

19. The non-transitory computer-readable medium of claim 18, wherein each of the first impact table, the second impact table and the service impact table provides a total severity value for each time interval, the total severity value indicating an expected business impact for a respective time interval, each impact table providing an impact value for each impact category within each time interval.

20. The non-transitory computer-readable medium of claim 19, wherein the instruction include instructions to:

calculate a severity value for each impact value in a respective impact table; and sum the severity values for the at least one impact category within each time interval to generate the total severity value for each time interval.

21. The data processing apparatus of claim 1, wherein the first impact table, the second impact table, and the service impact table are generated prior to receiving the service level agreement.

* * * * *